US011326895B2

(12) United States Patent
Pluciennik et al.

(10) Patent No.: US 11,326,895 B2
(45) Date of Patent: May 10, 2022

(54) METHODS AND SYSTEMS OF PROVIDING INFORMATION USING A NAVIGATION APPARATUS

(71) Applicants: TomTom International B.V., Amsterdam (NL); TomTom Navigation B.V., Amsterdam (NL)

(72) Inventors: Tomasz Pluciennik, Amsterdam (NL); Sonja Radenkovic, Amsterdam (NL); David Guiza Caicedo, Amsterdam (NL); Jose Carlos Silva Da Torre, Amsterdam (NL); Cornelis Klaas Van Dok, Amsterdam (NL); Andreia Cristina Ferreira Da Costa, Amsterdam (NL); Katarzyna Anna Kaczmarek, Amsterdam (NL); Daan Dirk Oostveen, Amsterdam (NL); Alexey Opokin, Amsterdam (NL)

(73) Assignees: TOMTOM INTERNATIONAl B.V., Amsterdam (NL); TOMTOM NAVIGATION B.V., Amsterdam (NL)

( * ) Notice: Subject to any disclaimer, the term of this patent is extended or adjusted under 35 U.S.C. 154(b) by 196 days.

(21) Appl. No.: 16/610,309

(22) PCT Filed: May 3, 2018

(86) PCT No.: PCT/EP2018/061312
§ 371 (c)(1),
(2) Date: Nov. 1, 2019

(87) PCT Pub. No.: WO2018/202757
PCT Pub. Date: Nov. 8, 2018

(65) Prior Publication Data
US 2020/0080862 A1 Mar. 12, 2020

(30) Foreign Application Priority Data

May 3, 2017 (GB) .................................. 1707070
Oct. 18, 2017 (GB) .................................. 1717085

(51) Int. Cl.
G06F 3/048 (2013.01)
G01C 21/36 (2006.01)
(Continued)

(52) U.S. Cl.
CPC ..... *G01C 21/3632* (2013.01); *G01C 21/3691* (2013.01); *G06F 3/0482* (2013.01); *G06F 3/04883* (2013.01); *G06F 2203/04803* (2013.01)

(58) Field of Classification Search
CPC ......................... G01C 21/3632; G01C 21/3691
See application file for complete search history.

(56) References Cited

U.S. PATENT DOCUMENTS 9,360,329 B2 * 6/2016 Miyata ............... G01C 21/3682
10,107,641 B2 * 10/2018 Zhou ..................... G01C 21/20
(Continued)

OTHER PUBLICATIONS

Search Report for International Application No. PCT/EP2018/061312 dated Aug. 13, 2018.

*Primary Examiner* — David Phantana-angkool
(74) *Attorney, Agent, or Firm* — Park, Vaughan, Fleming & Dowler LLP

(57) ABSTRACT

A method is disclosed for providing information to guide a user along a determined route to a destination through a navigable network using a navigation apparatus. The method comprises obtaining, using instructive data, a next manoeuvre to be made by the user and a distance to the next manoeuvre from a current position of the navigation apparatus. The method further comprises determining, using informative data, whether there is at least one event within (Continued)

a predetermined distance of the current position of the navigation apparatus. An order in which first and second portions of a graphical user interface (GUI) are arranged relative to each other within a display window is then determined based on a comparison of the distance to the next manoeuvre from the current position of the navigation apparatus and the distance to the event from the current position of the navigation apparatus, wherein the first portion of the GUI comprises an indication of the next manoeuvre, and wherein the second portion of the GUI comprises an indication of the event.

15 Claims, 22 Drawing Sheets

(51) Int. Cl.
   *G06F 3/0482* (2013.01)
   *G06F 3/04883* (2022.01)

(56) References Cited

U.S. PATENT DOCUMENTS

| | | | |
|---|---|---|---|
| 11,060,881 B2* | 7/2021 | Quint | G01C 21/3492 |
| D939,544 S * | 12/2021 | Lewis | D14/486 |
| 2007/0225902 A1* | 9/2007 | Gretton | G08G 1/096861 |
| | | | 701/533 |
| 2008/0046175 A1* | 2/2008 | Tengler | G01C 21/3647 |
| | | | 701/414 |
| 2013/0194109 A1* | 8/2013 | Clark | G01C 21/26 |
| | | | 340/905 |
| 2015/0241225 A1* | 8/2015 | Liu | G01C 21/3667 |
| | | | 701/540 |
| 2016/0290819 A1* | 10/2016 | Kalyanaraman | B60Q 1/346 |
| 2016/0364621 A1* | 12/2016 | Hill | G06T 7/70 |
| 2018/0128636 A1* | 5/2018 | Zhou | G01C 21/3697 |
| 2020/0080862 A1* | 3/2020 | Pluciennik | G01C 21/3679 |

* cited by examiner

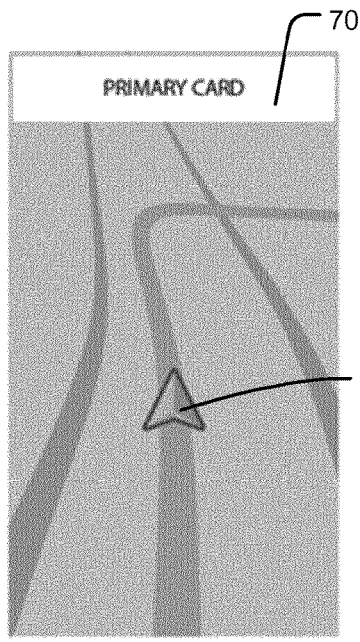 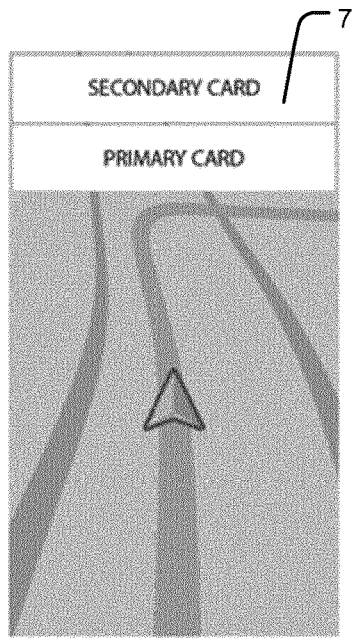 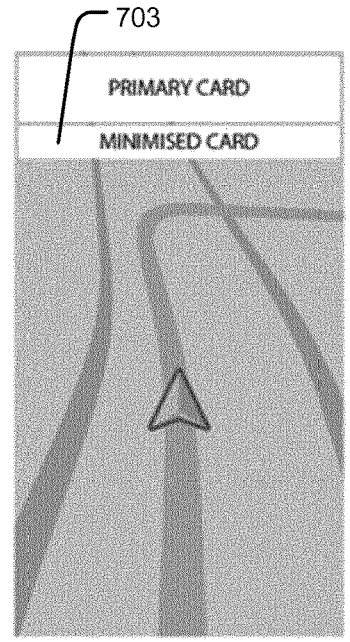
Figure 7A     Figure 7B     Figure 7C
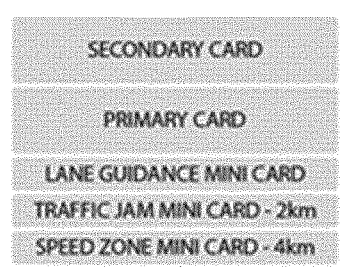 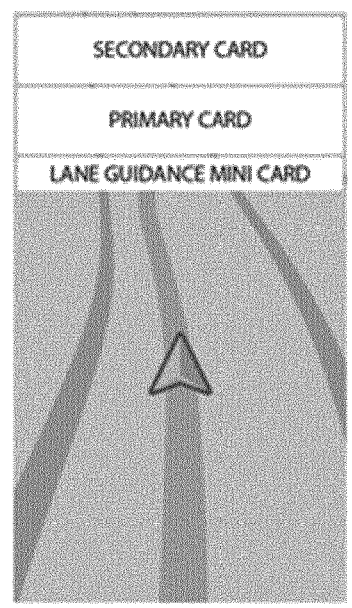
Figure 8

METHODS AND SYSTEMS OF PROVIDING INFORMATION USING A NAVIGATION APPARATUS

CROSS-REFERENCE TO RELATED APPLICATIONS

The present application is a National Stage of International Application No. PCT/EP2018/061312, filed on Apr. 3, 2018, and designating the United States, which claims benefit to United Kingdom Patent Applications 1707070.7 and 1717085.3 filed on May 3, 2017 and Oct. 18, 2017, respectively. The entire content of these applications is incorporated herein by reference.

FIELD OF THE INVENTION

This invention relates to methods and systems for providing information to a user of a navigation apparatus. The invention also extends to a navigation apparatus arranged to carry out the methods of the present invention. Illustrative embodiments of the invention relate to navigation apparatus in the form of portable navigation devices, so-called PNDs, that include global navigation satellite signal reception and processing functionality, and to methods of operating such devices. The invention is also applicable to navigation apparatus which forms part of an integrated navigation system, e.g. an in-vehicle navigation system, and methods of operating the same.

BACKGROUND TO THE INVENTION

The present invention is directed to methods of providing information, such as travel, traffic or navigation information, to a user of a navigation apparatus, and to a navigation apparatus arranged for carrying out the steps of the methods in accordance with embodiments of the invention. The navigation apparatus may comprise navigation apparatus of any suitable form as discussed above, and in more detail below.

One illustrative embodiment of the apparatus is a portable navigation device. Portable navigation devices (PNDs) that include GPS (Global Positioning System) signal reception and processing functionality are well known and are widely employed as in-car or other vehicle navigation systems. In general terms, a modern PND comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In a particularly preferred arrangement the output interface display may be configured as a touch sensitive display (by means of a touch sensitive overlay or otherwise) to additionally provide an input interface by means of which a user can operate the device by touch.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Wi-Fi, Wi-Max GSM and the like. PND devices of this type also include a GPS antenna by means of which satellite-broadcast signals, including location data, can be received and subsequently processed to determine a current location of the device.

The PND device may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically such features are most commonly provided in in-vehicle navigation systems, but may also be provided in PND devices if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the driver's own preferences for the factors determining road choice (for example the driver may specify that the route should not include motorways or toll roads).

In addition, the device may continually monitor road and traffic conditions, and offer to or choose to change the route over which the remainder of the journey is to be made due to changed conditions.

Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant) a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, TomTom International B.V. provides an on-line route planning and navigation facility at routes.tomtom.com, which facility allows a user to enter a start point and a destination whereupon the server to which the user's PC is connected calculates a route (aspects of which may be user specified) and generates a set of exhaustive navigation instructions for guiding the user from the selected start point to the selected destination.

In the context of a PND, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of current and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

It is also known to allow a route to be calculated with user defined criteria; for example, the user may prefer a scenic route to be calculated by the device, or may wish to avoid any roads on which traffic congestion is likely, expected or currently prevailing. The device software would then calculate various routes and weigh more favourably those that include along their route the highest number of points of interest (known as POIs) tagged as being for example of scenic beauty, or, using stored information indicative of prevailing traffic conditions on particular roads, order the calculated routes in terms of a level of likely congestion or delay on account thereof. Other POI-based and traffic information-based route calculation and navigation criteria are also possible.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above provide a reliable means for enabling users to navigate from one position to another.

During navigation along a pre-calculated route, information may be displayed to a user regarding events, such as traffic events, affecting the route to be travelled, or regarding POIs associated with the route. For example, the location and severity of congestion or accidents along the route may be indicated.

In some arrangements, information of this type may be displayed to the user by adding appropriate icons to a "traffic bar", which is a linear representation of a remainder of the route still to be travelled, and starting at a current position. The traffic bar gives an overview of any upcoming problems and provides a way of keeping this information separate from the main 2D or 3D navigation map that is displayed of the region surrounding a current position of the navigation apparatus.

One such arrangement is described in the patent publication U.S. 2007/0225902 A1, entitled "Navigation Device Displaying Dynamic Travel Information"; the entire content of which is incorporated herein by reference. In the arrangements disclosed in U.S. 2007/0225902 A1, the traffic bar is arranged to show the entire route to be travelled before travel along the route commences, i.e. when a current position corresponds to a start point of the pre-calculated route, or the entire remainder of the pre-calculated route to be travelled starting from a current position once travel along the route has commenced.

A similar arrangement is described in the patent publication WO 2008/083862 A1, entitled "Method of Indicating Traffic Delays, Computer Program and Navigation System Therefor"; the entire content of which is again incorporated herein by reference. In the arrangements disclosed in WO 2008/083862 A1, the relevance of an event affecting the remainder of a route to be travelled is used to determine whether an icon indicative of the event is displayed. Once again, a schematic linear representation of the route is provided in a "traffic bar" separate from the main navigation map, upon which icons indicative of delay incidents affecting the route, and their severity, may be superposed. The traffic bar shows a representation of the entire route to be travelled before travel along the route commences, or the entire remainder of the route to be travelled once travel has commenced.

A further arrangement is described in the patent publication WO 2014/060559 A1, entitled "Methods and Systems of Providing Information Using a Navigation Apparatus"; the entire content of which is again incorporated herein by reference. In the arrangements disclosed in WO 2014/060559 A1, a "route bar" is used to inform the user about upcoming events, such as traffic events. The route bar differs from the traffic bars discussed above in that it is a linear representation of only a portion of a route being travelled or a predicted path that is expected to be travelled. The route bar is scrollable to allow a user to see events on the route or path beyond the portion currently being shown. The scale of the linear representation can also be automatically increased as a certain event is approached in order to show more detailed information about the event, before returning to the original scale after the event is passed.

The Applicant has realised that there is a need for improved methods and systems for providing information to a user regarding a path, e.g. route, to be travelled.

SUMMARY OF THE INVENTION

In accordance with a first aspect of the invention there is provided a method of providing information to guide a user along a determined route to a destination through a navigable network comprising a plurality of decision points using a navigation apparatus, the method comprising:
- obtaining a current position of the navigation apparatus;
- obtaining, using instructive data comprising data indicative of manoeuvres to be made by the user at decision points of the navigable network along the determined route, a next manoeuvre to be made by the user and a distance to the next manoeuvre from the current position of the navigation apparatus;
- determining, using informative data comprising data indicative of events on the determined route of which the user may want to be alerted, whether there is at least one event within a predetermined distance of the current position of the navigation apparatus, and, when an event is determined to be within the predetermined distance, obtaining, using the informative data, a distance to the event from the current position of the navigation apparatus;
- determining an order in which first and second portions of a graphical user interface (GUI) are arranged relative to each other within a display window based on a comparison of the distance to the next manoeuvre from the current position of the navigation apparatus and the distance to the event from the current position of the navigation apparatus, wherein the first portion comprises an indication of the next manoeuvre, and wherein the second portion comprises an indication of the event; and
- providing data indicative of the GUI to a display device of the navigation apparatus to cause the display of the GUI thereon.

In accordance with a further aspect of the invention there is provided a method of providing information to guide a user along a determined route to a destination through a navigable network comprising a plurality of decision points using a navigation apparatus, the method comprising:
- obtaining a current position of the navigation apparatus;
- obtaining, using instructive data comprising data indicative of manoeuvres to be made by the user at decision points of the navigable network along the determined route, a next manoeuvre to be made by the user and a distance to the next manoeuvre from the current position of the navigation apparatus;
- determining, using informative data comprising data indicative of events on the determined route of which the user may want to be alerted, whether there is at least one event within a predetermined distance of the current position of the navigation apparatus, and, when an event is determined to be within the predetermined distance, obtaining, using the informative data, a distance to the event from the current position of the navigation apparatus;
- determining an order in which first and second portions of a graphical user interface (GUI) are arranged relative to each other within a display window based on a comparison of the distance to the next manoeuvre from the current position of the navigation apparatus and the distance to the event from the current position of the navigation apparatus, wherein the first portion comprises an indication of the next manoeuvre, and wherein the second portion comprises an indication of the event; and
- providing data indicative of the GUI to a display device of the navigation apparatus to cause the display of the GUI thereon,
- wherein the navigation apparatus comprises an element that, when selected by the user, causes the determined route to be changed.

The element may be comprised in the GUI, for instance in the second portion of the BUI.

The present invention extends to systems including means for carrying out a method in accordance with any of the aspects or embodiments of the invention described herein.

Accordingly, in accordance with yet a further aspect of the invention, there is provided a system for providing information to guide a user along a determined route to a destination through a navigable network comprising a plurality of decision points using a navigation apparatus, the system comprising:
- means for obtaining a current position of the navigation apparatus;
- means for obtaining, using instructive data comprising data indicative of manoeuvres to be made by the user at decision points of the navigable network along the determined route, a next manoeuvre to be made by the user and a distance to the next manoeuvre from the current position of the navigation apparatus;
- means for determining, from informative data comprising data indicative of events on the determined route of which the user may want to be alerted, whether there is at least one event within a predetermined distance of the current position of the navigation apparatus, and, when an event is determined to be within the predetermined distance, obtaining, using the informative data, a distance to the event from the current position of the navigation apparatus;
- means for determining an order in which first and second portions of a graphical user interface (GUI) are arranged relative to each other within a display window based on a comparison of the distance to the next manoeuvre from the current position of the navigation apparatus and the distance to the event from the current position of the navigation apparatus, wherein the first portion comprises an indication of the next manoeuvre, and wherein the second portion comprises an indication of the event; and
- means for providing data indicative of the GUI to a display device of the navigation apparatus to cause the display of the GUI thereon.

Accordingly, in accordance with yet a further aspect of the invention, there is provided a system for providing information to guide a user along a determined route to a destination through a navigable network comprising a plurality of decision points using a navigation apparatus, the system comprising:

means for obtaining a current position of the navigation apparatus;

means for obtaining, using instructive data comprising data indicative of manoeuvres to be made by the user at decision points of the navigable network along the determined route, a next manoeuvre to be made by the user and a distance to the next manoeuvre from the current position of the navigation apparatus;

means for determining, from informative data comprising data indicative of events on the determined route of which the user may want to be alerted, whether there is at least one event within a predetermined distance of the current position of the navigation apparatus, and, when an event is determined to be within the predetermined distance, obtaining, using the informative data, a distance to the event from the current position of the navigation apparatus;

means for determining an order in which first and second portions of a graphical user interface (GUI) are arranged relative to each other within a display window based on a comparison of the distance to the next manoeuvre from the current position of the navigation apparatus and the distance to the event from the current position of the navigation apparatus, wherein the first portion comprises an indication of the next manoeuvre, and wherein the second portion comprises an indication of the event; and means for providing data indicative of the GUI to a display device of the navigation apparatus to cause the display of the GUI thereon, wherein the navigation apparatus comprises an element that, when selected by the user, causes the determined route to be changed.

The element may be comprised in the GUI, for instance in the second portion of the BUI.

It will be appreciated that the invention in the second and further aspects may comprise any or all of the features described in respect of the method of the first aspect of the invention, and vice versa. Thus, even if not explicitly stated, the method may comprise the or further steps of controlling the apparatus to perform any of the functions described in relation to the system or apparatus, and the system or apparatus of the invention may further be arranged to perform any of the method steps herein described (or e.g. suitable means may be provided for the same). The system or apparatus may comprise a set of one or more processors arranged to carry out the steps mentioned. Any step may be carried out by any one of the processors, or by multiple processors. It will be appreciated that the method may be a method of operating a navigation apparatus.

The means for carrying out any of the steps of the method according to any of the aspects or embodiments described herein may comprise a set of one or more processors configured, e.g. programmed with a set of computer readable instructions, for doing so. A given step may be carried out using the same or a different set of processors to any other step. Any given step may be carried out using a combination of sets of processors. The system may further comprise data storage means, such as computer memory, for storing, for example, at least one repository including the instructive and/or informative data, as explained below.

As will be discussed in more detail below, the method of the present invention is preferably performed by a navigation application executed on one or more processors of a mobile navigation apparatus. The mobile navigation apparatus can be a dedicated apparatus having a primary purpose of providing guidance, and optionally route planning, functionality. Alternatively the mobile navigation apparatus could be a general computing system, e.g. a mobile telephone, and typically having location determining means, such as a global navigation satellite systems (GNSS) receiver. Again alternatively, albeit in less preferred embodiments, the navigation application could be executed on or more processors of a server that is in communication with a mobile navigation apparatus, such that the current position is obtained from the navigation apparatus, e.g. over a mobile telecommunications network, and the data indicative of the generated GUI is provided from the server to the mobile navigation apparatus, e.g. over a mobile telecommunications network, for display thereon.

In accordance with the invention, a graphical user interface (GUI) is provided for display to a user in order to guide a user along a determined route to a destination through a navigable network, such as a road network, and which comprises at least two portions: a first portion including instructive data concerning a next manoeuvre that needs to be made by the user to follow the determined route; and a second portion including informative data concerning an upcoming event on the navigable network, e.g. a traffic jam, adverse weather, speed camera, etc. Thus, the GUI may include a first display element (i.e. portion) showing the instructive data and a second display element (i.e. portion) showing the informative data about events along the route. The first and second portions are arranged in the GUI in an order based on the relative distances from the current position of the navigation apparatus (and thus user) to the determined next manoeuvre and the determined event, i.e. according to distance from the current position. This means, for example, that the second portion may be positioned above the first portion in the GUI when the next manoeuvre is closer to the current position than the next event; then, after the manoeuvre has been made, such that the first portion now relates to a different manoeuvre that is further away from the current position than the next event, the first portion moves to being positioned above the second portion. The invention thus enables a user to see both instructive and informative data about a predetermined route being followed, e.g. when using a so-called turn-by-turn navigation application, and the distance relation of this data to a current position, in a manner that is efficient in its use of available screen space on a display device. This latter advantage is provided due to selecting an order in which to display the data in the graphical user interface based on the relative distances from the current position to the next manoeuvre and the next event. Preferably the instructive and informative data is stored in at least one repository, preferably as a list or lists of the manoeuvres and events (generally, items) upcoming along the determined route. The list(s) of upcoming items may thus be considered as a stack of 'cards', with the GUI displaying the cards in the stack in sequence as the user progresses along the route.

In accordance with the invention, information is provided to a user, e.g. a driver of a vehicle, to guide the user along a predetermined route to a destination through a navigable network. The navigable network comprises a plurality of decision points, e.g. where a user is required to select one manoeuvre from a plurality of possible manoeuvres. The navigable network may comprise a road network, and decision points of the road network are, for example, road intersections, junctions, roundabouts, etc. As will be appreciated, however, the navigable network is not limited to a road network, and may comprise, for example, a network of foot paths, cycle paths, rivers, etc.

The method may comprise calculating the route to the destination. The route is calculated from an origin, which may be the current position of the navigation apparatus, to the destination. The destination may be set by the user, or could be predicted based on the travel history of the user, e.g. using the time of departure, day of departure and origin. The method may, in some embodiments, therefore comprise receiving an origin and/or destination from the user that is used to calculate the route. The route may be calculated in any suitable manner, and may be in accordance with user specified criteria, such as the fastest route, the shortest route, the most fuel efficient route, etc. The step of calculating the route may be carried out by the navigation apparatus. Alternatively, the route calculation may be carried out remotely from the navigation apparatus, e.g. on a server, based on an origin, such as the current position of the navigation apparatus, and destination received over a communications link from the navigation apparatus. In such embodiments, data indicative of the determined route may be sent to the navigation apparatus from the server over the communications link.

The route is calculated using a digital map having a plurality of segments that represent the navigable network, e.g. road network. The digital map, which is also referred to as an electronic map herein, (or mathematical graph, as it is sometimes known), in its simplest form, is effectively a database containing data representative of nodes, most commonly representative of road intersections, and lines between those nodes representing the roads between those intersections. In more detailed digital maps, lines may be divided into segments defined by a start node and end node. These nodes may be "real" in that they represent a road intersection at which a minimum of three lines or segments intersect, or they may be "artificial" in that they are provided as anchors for segments not being defined at one or both ends by a real node to provide, among other things, shape information for a particular stretch of road or a means of identifying the position along a road at which some characteristic of that road changes, e.g. a speed limit. In practically all modern digital maps, nodes and segments are further defined by various attributes which are again represented by data in the database. For example, each node will typically have geographical coordinates to define its real-world position, e.g. latitude and longitude. Nodes will also typically have manoeuvre data associated therewith, which indicate whether it is possible, at an intersection, to move from one road to another; while the segments will also have associated attributes such as the maximum speed permitted, the lane size, number of lanes, whether there is a divider in-between, etc. The electronic map may also contain data representative of the names of the roads within the road network.

The invention comprises obtaining a current position of the navigation apparatus. The navigation apparatus is portable, i.e. capable of traversing the navigable network, whether embodied as a hand-held PND, mobile phone, or mounted on or within a vehicle. As the navigation apparatus is associated with the user, the current position of the navigation apparatus can be seen as being analogous to the current position of the user, e.g. driver. The navigation apparatus comprises a location determining device that is capable of determining the current position of the navigation apparatus in relation to the navigable network. The location determining device may comprise any location detection means for determining the location of the apparatus, e.g. a global navigation satellite system (GNSS), e.g. GPS or GLONASS, receiver. As will be appreciated, the apparatus may use other means for determining its current position as desired, e.g. terrestrial beacons, the mobile telecommunications network, etc.

In embodiments in which the method is performed on the navigation apparatus, the step of obtaining a current position of the navigation apparatus can include determining the current position of the navigation apparatus using location determining means of the navigation apparatus. In other embodiments, e.g. in which the method is performed on a server, the step of obtaining a current position of the navigation apparatus can include receiving the current position of the navigation apparatus, as determined by a location determining means associated with the navigation apparatus, over a communications link, which may be wired or wireless, from the navigation apparatus.

The instructive data is generally stored in at least one repository. A, some or all of the repositories could be stored locally, e.g. in a memory of the navigation apparatus. Additionally, or alternatively, a, some or all of the repositories could be stored remotely, e.g. in a memory of a remote server, such that said accessing may comprise obtaining the instructive data over a communications link, which may be wired or wireless. The invention may thus generally comprise a step of accessing (the) instructive data stored in at least one repository. Similarly, the system may comprise at least one repository and means for accessing instructive data stored in the at least one repository.

The instructive data comprises data indicative of manoeuvres to be made by the user at decision points of the navigable network along the determined route, and, for example, in order to travel to determined route. As discussed above, the term decision point of the navigable network refers to a location at which a user is required to select one manoeuvre from a plurality of possible manoeuvres. Examples of such decision points include: a location, such as a junction or intersection of a road network, at which a user is able to progress along two or more different paths; a location, such as on a multi-lane highway of a road network, at which a user is able to travel in multiple lanes; and a location of a point of interest (POI) that is on the determined route, e.g. having been selected by the user, and where the user is expected to stop. Examples of POIs are waypoints along the route, such as viewpoints, parking locations, fuel stations, etc., and the destination of the determined route.

The data indicative of manoeuvres can include one or more of: a type of the manoeuvre, e.g. left turn, right turn, continue straight, change lane, stopping at a POI, the type of POI, etc.; a location of the manoeuvre, e.g. junction, POI, etc.; a distance, e.g. along the determined route, to the location of the manoeuvre from the current position of the navigation apparatus; and a textual description of the location of the manoeuvre, e.g. junction, POI, etc. (e.g. that is human readable).

The method of the invention comprises obtaining, using the (stored) instructive data, a next manoeuvre to be made by the user and a distance to the next manoeuvre. That is, the invention may comprise steps of (and/or means for) accessing instructive data stored in at least one repository, and obtaining, using the stored instructive data, the next manoeuvre to be made and a distance to the next manoeuvre. The instructive data can be stored in the at least one repository as a list of manoeuvres ordered according to their position along the determined route from the current position of the navigation apparatus to the destination. By using such an ordered list, the step of obtaining the next manoeuvre can comprise retrieving the next entry in the list. Similarly, the step of the distance to the next manoeuvre can comprise the retrieving the information from the relevant entry in the stored instructive data.

The method may comprise determining the instructive data, and storing the determined data in (the) at least one repository. The instructive data is preferably determined as part of the step of calculating the route. Accordingly, and as discussed above, the determination of the instructive data may be carried out by the navigation apparatus or on a remote server.

The instructive data stored in the at least on repository is preferably updated as the user progresses along the determined route, such that information concerning manoeuvres that have already been made by the user is removed from the at least one repository. The instruction data can be updated by removing data concerning individual manoeuvres from the at least on repository, e.g. by deleting entries from the list of manoeuvres. Alternatively, the stored instructive data can be replaced in its entirety, e.g. on a regular basis. For example, new instructive data can be received periodically (at a constant or variable frequency) from a remote server, e.g. the server that calculates the route, as the navigation apparatus progresses along the route based on the received current position.

The invention also uses informative data comprising data indicative of events on the determined route of which the user may want to be alerted. According to the preferred embodiments of the invention, event data indicative of events of which the user may want to be alerted is received from a server based on the current position of the navigation apparatus. The system may thus comprise means for receiving event data from a server based on the current position of the navigation apparatus. Examples of events can include one or more of: traffic events, such as traffic jams, lane closures, roadworks, etc.; adverse weather events, such as snow, heavy rain, etc.; accident black spots; average or restricted speed zones; fixed or mobile speed cameras; and possible points of interest (POIs) that the user may wish to add into the route, such as suggested parking locations, suggested fuel stops, suggested starts of alternative routes to the destination, etc. As will therefore be appreciated, the term "event" is intended to encompass any location associated with a potential problem or benefit of which the user may want to be alerted or informed. An event may be a point location or an extended location, e.g. an area or zone. Events may be temporary in nature, e.g. a few minutes' duration, e.g. a traffic jam or fog, or that last hours or days, such as mobile speed cameras, road works, lane closures, and as such can potentially start, end and/or vary (in terms of size, location, property, etc.) during the user's progress along the determined route. Accordingly at least some of the received event data preferably comprises dynamic travel information, e.g. traffic information, weather information, etc. The event data may therefore be considered "live" information, e.g. data which is relatively current.

In embodiments in which the method is performed on the navigation apparatus, the event data may be received from a remote server over a communications link, e.g. a mobile telecommunications network, using a wireless communications device of the navigation apparatus. In other embodiments, e.g. in which the method is performed on a server, the event data can be received from another server over a communications link, which can be wired or wireless.

In embodiments, informative data based on the event data received from a server may be stored in at least one repository. It will be appreciated that the instructive data and informative data could be stored in the same repository, e.g. as two different lists or as a combined list of manoeuvres and events, or could be stored in different repositories. The system may thus comprise means for storing informative data based on the received event data in the at least one or another repository. The informative data comprises data indicative of events on, or affecting, the determined route of which the user may want to be alerted. An event may be a point location or an extended location, e.g. an area or zone along the determined route. An event may therefore be associated with a single location on the route or a plurality of locations along the route. When an event is an extended location, then the event has a start location and an end location on the determined route; the event affecting the portion of the determined route between the start and end points. In some embodiments, when the event data received from the server only relates to events on the determined route, the informative data that is stored may comprise, or consist of, the event data. In other embodiments, the method comprises determining the informative data from the event data received from the server, e.g. filtering the received event data using data indicative of the determined route and/or deriving the informative data from the received event data.

The data indicative of events forming the informative data can include one or more of: a type of the event; a severity of the event; a location of the event; a distance, e.g. along the determined route, to the location, or start location in the case of extended locations, of the event from the current position of the navigation apparatus; and a textual description of the location of the event (e.g. that is human readable).

As discussed above in relation to the instructive data, the informative data stored in the at least one repository can be a list of events on the determined route ordered according to their position along the determined route from the current position of the navigation apparatus to the destination. The informative data and the instructive data may, in some embodiments, be stored together in a combined list that is ordered according to their position and the determined route from the current position of the navigation apparatus to the destination.

Event data is received from the server based on the current position of the navigation apparatus, and as such new or updated event data may be regularly received as the user progresses along the determined route. Accordingly, any informative data relating to the events stored in the or a repository is preferably updated as the user progresses along the determined route. For example, such that that information concerning events that have expired, e.g. following the dissolution of a traffic jam or the removal of a temporary speed camera, and/or that have already been passed by the user are removed the at least one repository. The informative data can be updated by removing data concerning individual events from the at least on repository, e.g. by deleting entries from the list of events. Alternatively, the stored informative data can be replaced in its entirety, e.g. on a regular basis. For example, new event (and/or informative) data can be received periodically (at a constant or variable frequency) from a remote server, e.g. the server that calculates the route, as the navigation apparatus progresses along the route based on the received current position.

Accordingly, in a preferred embodiment of the invention, there is provided a method of providing information to guide a user along a determined route to a destination through a navigable network comprising a plurality of decision points using a navigation apparatus, the method comprising:

obtaining a current position of the navigation apparatus;

accessing instructive data stored in at least one repository, wherein said instructive data comprises data indicative of manoeuvres to be made by the user at decision points of the navigable network along the determined route;

obtaining, using the stored instructive data, a next manoeuvre to be made by the user and a distance to the next manoeuvre from the obtained current position;

receiving event data from a server based on the obtained current position, wherein said event data comprises data indicative of events of which the user may want to be alerted;

storing informative data based on the received event data in the at least one repository, wherein said informative data compromises data indicative of events on the determined route of which the user may want to be alerted;

determining, from the stored informative data, whether there is at least one event within a predetermined distance of the obtained current position, and, when an event is determined to be within the predetermined distance, obtaining, using the stored informative data, a distance to the event from the obtained current position;

determining an order in which first and second portions of a graphical user interface (GUI) are arranged relative to each other within a display window based on a comparison of the distance to the next manoeuvre from the obtained current position and the distance to the event from the obtained current position, wherein the first portion comprises an indication of the next manoeuvre, and wherein the second portion comprises an indication of the event; and providing data indicative of the GUI to a display device of the navigation apparatus to cause the display of the GUI thereon.

Similarly, in another preferred embodiment of the invention, there is provided a system for providing information to guide a user along a determined route to a destination through a navigable network comprising a plurality of decision points using a navigation apparatus, the system comprising:

means for obtaining a current position of the navigation apparatus;

means for accessing instructive data stored in at least one repository, wherein said instructive data comprises data indicative of manoeuvres to be made by the user at decision points of the navigable network along the determined route;

means for obtaining, using the stored instructive data, a next manoeuvre to be made by the user and a distance to the next manoeuvre from the obtained current position;

means for receiving event data from a server based on the obtained current position, wherein said event data comprises data indicative of events of which the user may want to be alerted;

means for storing informative data based on the received event data in the at least one repository, wherein said informative data compromises data indicative of events on the determined route of which the user may want to be alerted;

means for determining, from the stored informative data, whether there is at least one event within a predetermined distance of the obtained current position, and, when an event is determined to be within the predetermined distance, obtaining, using the stored informative data, a distance to the event from the obtained current position;

means for determining an order in which first and second portions of a graphical user interface (GUI) are arranged relative to each other within a display window based on a comparison of the distance to the next manoeuvre from the obtained current position and the distance to the event from the obtained current position, wherein the first portion comprises an indication of the next manoeuvre, and wherein the second portion comprises an indication of the event; and means for providing data indicative of the GUI to a display device of the navigation apparatus to cause the display of the GUI thereon.

In the method of the present invention, the method comprises determining, preferably from stored informative data, whether there is at least one event within a predetermined distance of the obtained current position of the navigation apparatus. In embodiments in which the informative data comprises, for each event, a distance, e.g. along the determined route, to the location from the current position of the navigation apparatus, the determination step can comprise searching the stored informative data based on the distance value associated with each event. The predetermined distance can be dependent on the type of event. For example, a suggestion of the start of a possible alternative route may be presented to the driver before a speed camera or traffic jam, e.g. such that the driver has more time to decide whether to take the suggested alternative route.

A first portion of a graphical user interface (GUI) comprises an indication of the next manoeuvre obtained using the stored instructive data, and a second portion of the GUI comprises an indication of an event determined to be within the predetermined distance. The order in which the first and second portions of the GUI are arranged relative to each other in the GUI is based on a comparison of the distance to the next manoeuvre from the current position of the navigation apparatus and the distance to the event from the current position of the navigation apparatus, i.e. such that the portions are arranged by distance from the current position of the navigation apparatus. For example, where the first and second portions are superimposed on top of the normal navigation view, the portions may be arranged so that the next item along the route is displayed closest to the chevron indicating the current position of the navigation apparatus within the navigation map (i.e. typically towards the bottom of the display). It will be appreciated that when there are no events within a predetermined distance of the current position of the navigation apparatus, then the GUI may include the first portion comprising an indication of the next manoeuvre (and not the second portion). That is, at least during the navigation view, when the user is following a determined route, the GUI will typically always display an indication of the next manoeuvre (i.e. the first portion), as there is always another manoeuvre to be made. However, according to embodiments, the event data (i.e. the second portion) may only be displayed when it is determined that an event is within a predetermined distance of the current position of the navigation apparatus, in which case the order in which the first and second portions of the GUI are arranged relative to each other may be determined as described herein. The predetermined distance for which event information is displayed using a second portion of the GUI may be set or selected as appropriate e.g. depending on the user's preferences, and/or on the type of event.

As will be appreciated, more than one event may be determined to be within a predetermined distance, or the predetermined distance associated with the particular event. In such embodiments, the GUI may include a further portion for each of the one or more additional events, wherein the further portion comprises an indication of the additional event. To prevent too much information being simultaneously shown to the user, however, the GUI may only include portions for a predefined maximum number of events. The maximum number may be based, for example, on the orientation of the display device of the navigation apparatus. In other words, a first maximum number can be used when the display device of the navigation apparatus is in a portrait orientation, and a second maximum number can be used when the display device of the navigation apparatus is in a landscape orientation. In such embodiments, the subset of events that are selected from the set of events that are within a predetermined distance, and that are shown to the user in the GUI, may be selected according to one or more suitable ranking criteria e.g. based on the type and/or severity of the particular event.

In embodiments where the GUI includes a plurality of portions relative to events, the order in which the first, second and further portions of the GUI are arranged relative to each other in the GUI is based on the relative distances from the current position of the navigation apparatus to the respective manoeuvre or event, i.e. such that the portions are arranged by distance from the current position to the navigation apparatus.

The indication of the next manoeuvre shown in the first portion of the GUI preferably comprises one or more of: an icon showing the type of manoeuvre to be made; a textual description of the location of the manoeuvre; and the current distance, e.g. along the determined route, from the current position to the manoeuvre. As will be appreciated, the displayed distance will change, typically decrease, as the user progresses along the determined route.

The indication of an event shown in the second or further portions of the GUI preferably comprises one or more of: an icon showing the type of event; an indication of the severity of the event; a textual description of the location of the event; and the current distance, e.g. along the determined route, from the current position to the event. As will be appreciated, the displayed distance will change, typically decrease, as the user progresses along the determined route.

In embodiments in which the event shown in the second or further portions of the GUI has an extended location, e.g. a traffic jam or average speed zone, the indication of the event preferably changes once the start location of the event has been passed to additionally or alternatively show an indication of the user's progress through the extended location. For example, the extended location may be visualised as a line, one end of which corresponds to the start location, and the other end corresponding to the end location, and an icon representative of the current position of the user within the zone is displayed on the line.

In preferred embodiments, at least in a navigation view, the method further comprises displaying a representation of a 2D or 3D navigation map in the graphical user interface simultaneously with displaying the first, second, and optionally further portions relating to the next manoeuvre and event(s). The navigation map may provide a representation of a current position and an indication of the path to be taken from the current position to follow the predetermined route. The navigation map provides a representation of the actual surroundings to facilitate navigation. The navigation map is preferably shown in the same display window as the first, second, and optionally further portions, with the portions preferably being overlaid on the navigation map. It is envisaged, however, that the navigation map may be shown in a different display window.

The portions of the GUI relating to the next manoeuvre (e.g. the first portion) and one or more upcoming events (e.g. the second and further portions) can be thought of as display "cards", and more specifically as "What's Ahead Cards", wherein each card represents an important item that a user will encounter as they progress along a route. Each portion of the GUI (e.g. each card displayed on the GUI) preferably comprises at least one selectable GUI element that can be individually selected by the user. The selectable element is preferably selectable using a touch based command, e.g. a gesture, tap, etc. In preferred embodiments, a selection of a selectable GUI element of any one of the first, second and/or further portions causes the graphical user interface (GUI) to show at least some, and preferably all, of the manoeuvres and events on the determined route from the current position to the destination in the display window, e.g. to transition from a navigation view to a route summary view. The route summary view preferably comprises a list of the manoeuvres and events ordered according to distance, e.g. along the determined route, from the current position. The route summary view preferably shows the cards associated with each upcoming manoeuvre and event.

In embodiments, at least some cards generated using the stored informative data can comprise an additional selectable GUI element that, when selected by the user, causes the determined route to be changed. For example, a waypoint, or other POI such as a petrol station or car park, may be added to the route, or it may be desired to take an alternative route to the destination so as to avoid a traffic jam on the current route. In such embodiments, when the route to the destination is recalculated, the stored instructive and informative data is changed, i.e. refreshed, so as to relate to the new route. Similarly, when the route is automatically recalculated due to factors on the navigable network that affect progress along the route, such as traffic jams, accidents, blocked roads, etc., then the stored instructive and informative data is again refreshed so as to relate to the new route.

In the method of the present invention, data of the graphic user interface is provided to a display device of the navigation apparatus to cause the display of the GUI thereon. When the method is performed on the navigation apparatus, the method may further comprise displaying the graphic user interface on the display device. In other embodiments, however, such as when the method is performed on a server, or the display device is remote from the apparatus performing the invention, said providing can comprise transmitting the data indicative of the GUI over a communications link, which may be wired or wireless.

The principles of the present invention are applicable to any form of navigation apparatus, or indeed any location-aware mobile device. In accordance with any of the aspects or embodiments of the invention the apparatus may comprise a display for displaying a digital map to a user, a processor configured to access electronic map data and cause an electronic map to be displayed to a user via the display, and typically a user interface operable by a user to enable the user to interact with the apparatus. References to a processor may refer to a set of one or more processors. Thus, it will be appreciated that the navigation apparatus may comprise a set of one or more processors for carrying out any of the steps described. For example, the "means for" carrying out any of the steps may be a set of one or more processors.

Regardless of its implementation, a navigation apparatus used in accordance with the present invention may comprise a processor, memory, and electronic map data stored within said memory. The processor and memory cooperate to provide an execution environment in which a software operating system may be established. One or more additional software programs may be provided to enable the functionality of the apparatus to be controlled, and to provide various other functions. A navigation apparatus of the invention may preferably include Global Navigation Satellite Systems (GNSS), such as GPS, signal reception and processing functionality. The apparatus may comprise one or more output interfaces by means of which information may be relayed to the user. The output interface(s) may include a speaker for audible output in addition to the visual display. The apparatus may comprise input interfaces including one or more physical buttons to control on/off operation or other features of the apparatus.

In embodiments of the invention, the navigation apparatus is a mobile navigation apparatus, also referred to as a portable navigation device (PND). In embodiments the navigation apparatus is located in a vehicle. The current location of the navigation apparatus will therefore correspond to the current location of the user/driver and/or vehicle, as appropriate. The invention is also applicable to navigation apparatus which is provided as part of an integrated navigation system. For example the apparatus may form part of an in-vehicle integrated navigation system.

In other embodiments, the navigation apparatus may be implemented by means of an application of a processing device which does not form part of a specific navigation device. For example the invention may be implemented using a suitable computer system arranged to execute navigation software. The system may be a mobile or portable computer system, e.g. a mobile telephone or laptop, or may be a desktop system.

The present invention extends to a computer program product comprising computer readable instructions executable to perform a method according to any of the aspects or embodiments of the invention, or to cause a navigation apparatus to perform such methods.

The present invention extends to a, preferably non-transitory, computer program product comprising computer readable instructions executable when run on a navigation apparatus in accordance with any of the embodiments of the invention to cause a set of one or processors of the navigation apparatus to perform the steps of any of the aspects or embodiments of the method described herein.

It will be appreciated that any of the further aspects of the invention may include any or all of the features of the invention described in relation to any other aspects and embodiments of the invention to the extent they are not mutually inconsistent therewith.

Advantages of these embodiments are set out hereafter, and further details and features of each of these embodiments are defined in the accompanying dependent claims and elsewhere in the following detailed description.

BRIEF DESCRIPTION OF THE DRAWINGS

FIGS. 7A, 7B and 7C illustrate how the display cards may be presented on a GUI;

FIGS. 8, 9 and 10 illustrate examples of how to select which display cards are displayed according to a set of display rules;

DETAILED DESCRIPTION OF PREFERRED EMBODIMENTS

The description with respect to FIGS. 1 to 4 provides background information to facilitate understanding of the invention in its various embodiments. Preferred embodiments of the present invention will now be described with particular reference to a PND. It should be remembered, however, that the teachings of the present invention are not limited to PNDs but are instead universally applicable to any type of processing device that is configured to execute navigation software so as to provide route planning and navigation functionality. It follows therefore that in the context of the present application, a navigation device is intended to include (without limitation) any type of route planning and navigation device, irrespective of whether that device is embodied as a PND, a navigation device built into a vehicle, or indeed a computing resource (such as a desktop or portable personal computer (PC), mobile telephone or portable digital assistant (PDA)) executing route planning and navigation software.

It will also be apparent from the following that the teachings of the present invention even have utility in circumstances where a user is not seeking instructions on how to navigate from one point to another, but merely wishes to be provided with a view of a given location or information about a current or upcoming location. In such circumstances the "destination" location selected by the user need not have a corresponding start location from which the user wishes to start navigating, and as a consequence references herein to the "destination" location or indeed to a "destination" view should not be interpreted to mean that the generation of a route is essential, that travelling to the "destination" must occur, or indeed that the presence of a destination requires the designation of a corresponding start location.

Figure 1:
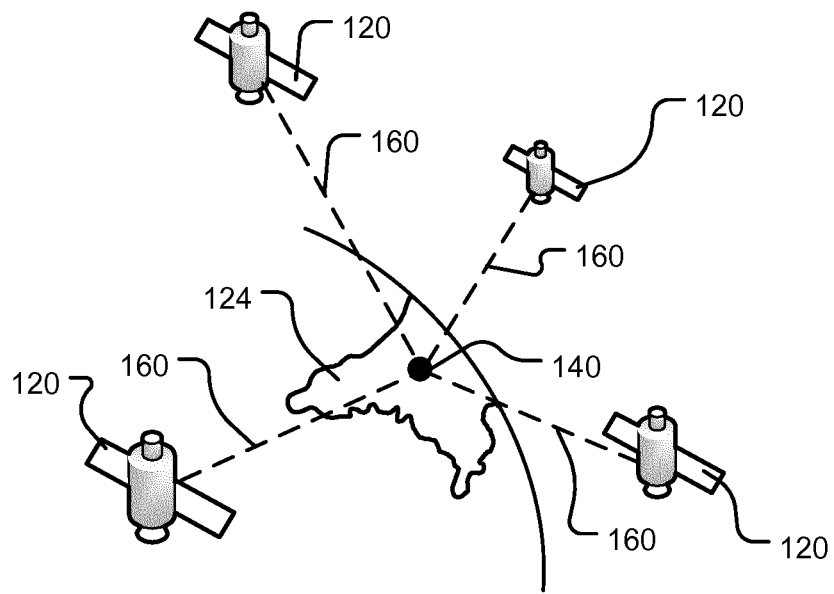
FIG. 1 illustrates an example view of Global Positioning System (GPS), usable by navigation devices.

With the above provisos in mind, FIG. 1 illustrates an example view of Global Positioning System (GPS), usable by navigation devices. Such systems are known and are used for a variety of purposes. In general, GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140 is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
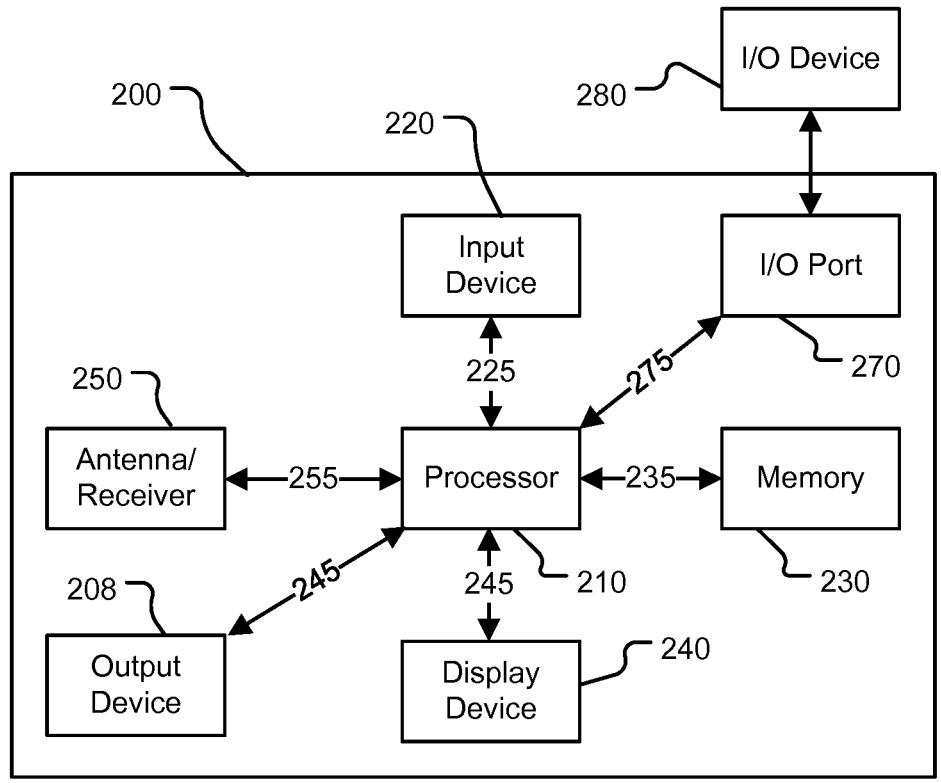
FIG. 2 is an illustrative representation of electronic components of a navigation device that may be used to implement the techniques according to the present invention.

FIG. 2 is an illustrative representation of electronic components of a navigation device 200 that may be used to implement the techniques according to the present invention, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch panel and/or any other known input device utilised to input information; and the display screen 240 can include any type of display screen such as an LCD display, for example. In a particularly preferred arrangement the input device 220 and display screen 240 are integrated into an integrated input and display device, including a touchpad or touchscreen input so that a user need only touch a portion of the display screen 240 to select one of a plurality of display choices or to activate one of a plurality of virtual buttons.

The navigation device may include an output device 260, for example an audible output device (e.g. a loudspeaker). As output device 260 can produce audible information for a user of the navigation device 200, it is should equally be understood that input device 240 can include a microphone and software for receiving input voice commands as well.

In the navigation device 200, processor 210 is operatively connected to and set to receive input information from input device 220 via a connection 225, and operatively connected to at least one of a display screen 240 and output device 260, via output connections 245, to output information thereto. Further, the processor 210 is operably coupled to a memory resource 230 via connection 235 and is further adapted to receive/send information from/to input/output (I/O) ports 270 via connection 275, wherein the I/O port 270 is connectible to an I/O device 280 external to the navigation device 200. The memory resource 230 comprises, for example, a volatile memory, such as a Random Access Memory (RAM) and a non-volatile memory, for example a digital memory, such as a flash memory. The external I/O device 280 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered to be within the scope of the present application. For example, the components shown in FIG. 2 may be in communication with one another via wired and/or wireless connections and the like. Thus, the scope of the navigation device 200 of the present application includes a portable or handheld navigation device 200.

In addition, the portable or handheld navigation device 200 of FIG. 2 can be connected or "docked" in a known manner to a vehicle such as a bicycle, a motorbike, a car or a boat for example. Such a navigation device 200 is then removable from the docked location for portable or handheld navigation use.

Figure 3:
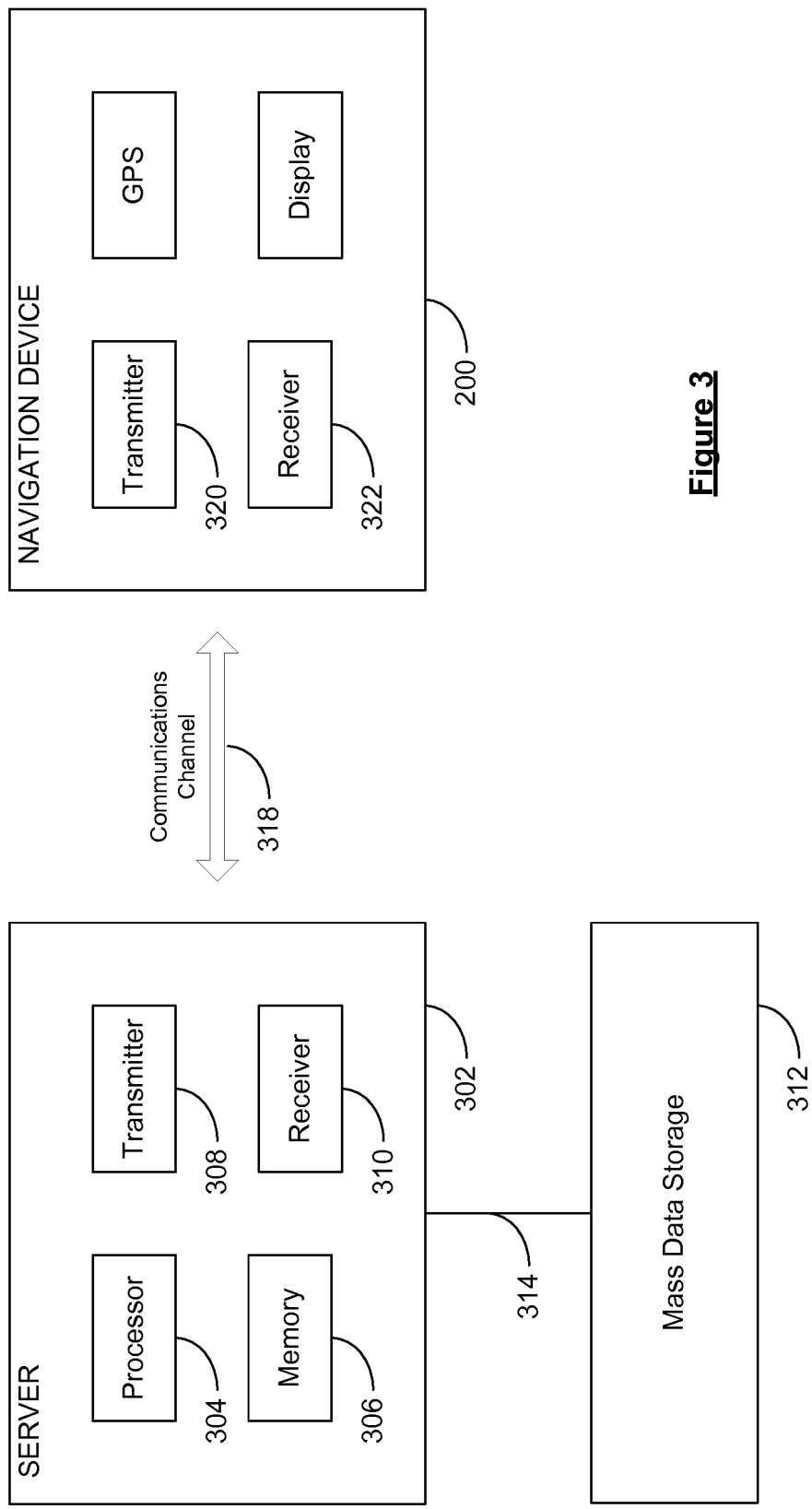
FIG. 3 illustrates how a navigation device may communicate with a server in order to receive information therefrom.

Referring now to FIG. 3, the navigation device 200 may establish a "mobile" or telecommunications network connection with a server 302 via a mobile device (not shown) (such as a mobile phone, PDA, and/or any device with mobile phone technology) establishing a digital connection (such as a digital connection via known Bluetooth technology for example). Thereafter, through its network service provider, the mobile device can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information. The establishing of the network connection between the mobile device (via a service provider) and another device such as the server 302, using an internet (such as the World Wide Web) for example, can be done in a known manner. This can include use of TCP/IP layered protocol for example. The mobile device can utilize any number of communication standards such as CDMA, GSM, WAN, etc.

As such, an internet connection may be utilised which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet).

The navigation device 200 can further complete a data connection with the mobile device, and eventually with the internet and server 302, via existing Bluetooth technology for example, in a known manner, wherein the data protocol can utilize any number of standards, such as the GPRS, the Data Protocol Standard for the GSM standard, for example.

The navigation device 200 may include its own mobile phone technology within the navigation device 200 itself (including an antenna for example, or optionally using the internal antenna of the navigation device 200). The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the internet for example, in a manner similar to that of any mobile device.

For GPRS phone settings, a Bluetooth enabled navigation device may be used to correctly work with the ever changing spectrum of mobile phone models, manufacturers, etc., model/manufacturer specific settings may be stored on the navigation device 200 for example. The data stored for this information can be updated.

In FIG. 3 the navigation device 200 is depicted as being in communication with the server 302 via a generic communications channel 318 that can be implemented by any of a number of different arrangements. The server 302 and a navigation device 200 can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302. The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fibre optic cables, converters, radio-frequency (RF) waves, the atmosphere, empty space, etc. Furthermore, the communication channel 318 can include intermediate devices such as routers, repeaters, buffers, transmitters, and receivers, for example.

In one illustrative arrangement, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc.

The server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated automatically or upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

As indicated above in FIG. 2, a navigation device 200 includes a processor 210, an input device 220, and a display screen 240. The input device 220 and display screen 240 are integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device 241, such as audio input/output devices for example.

Figure 4:
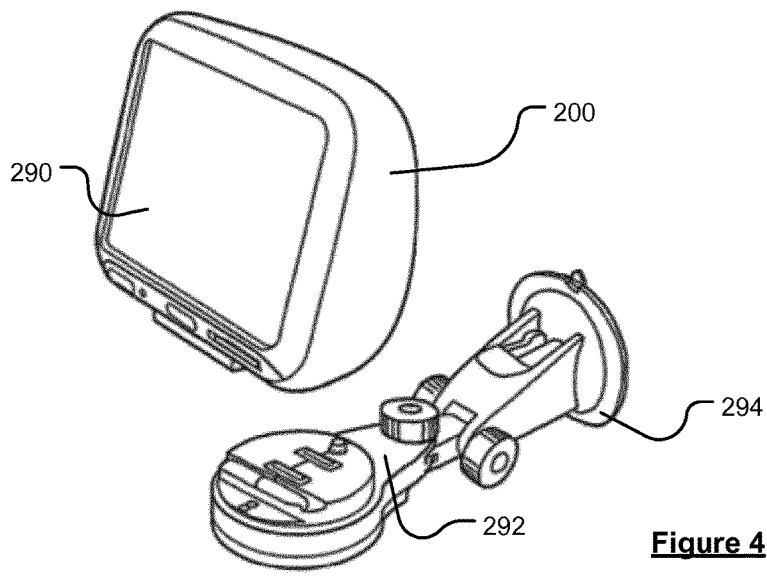
FIG. 4 is a perspective view of a navigation device and a mounting system for mounting the navigation device within a vehicle.

FIG. 4 is a perspective view of a navigation device 200. As shown in FIG. 4, the navigation device 200 may be a unit that includes an integrated input and display device 290 (a touch panel screen for example) and the other components of FIG. 2 (including but not limited to internal GPS receiver 250, microprocessor 210, a power supply, memory systems 230, etc.). The navigation device 200 may sit on an arm 292, which itself may be secured to a vehicle dashboard, window, etc. using a suction cup 294. This arm 292 is one example of a docking station to which the navigation device 200 can be docked. The navigation device 200 can be docked or otherwise connected to an arm 292 of the docking station by snap connecting the navigation device 292 to the arm 292 for example. To release the connection between the navigation device 200 and the docking station, a button on the navigation device 200 may be pressed, for example. Other equally suitable arrangements for coupling and decoupling the navigation device to a docking station are well known to persons of ordinary skill in the art.

Embodiments of the invention relating to so-called "What's Ahead Cards" (WAC) will now be described.

Figure 5:
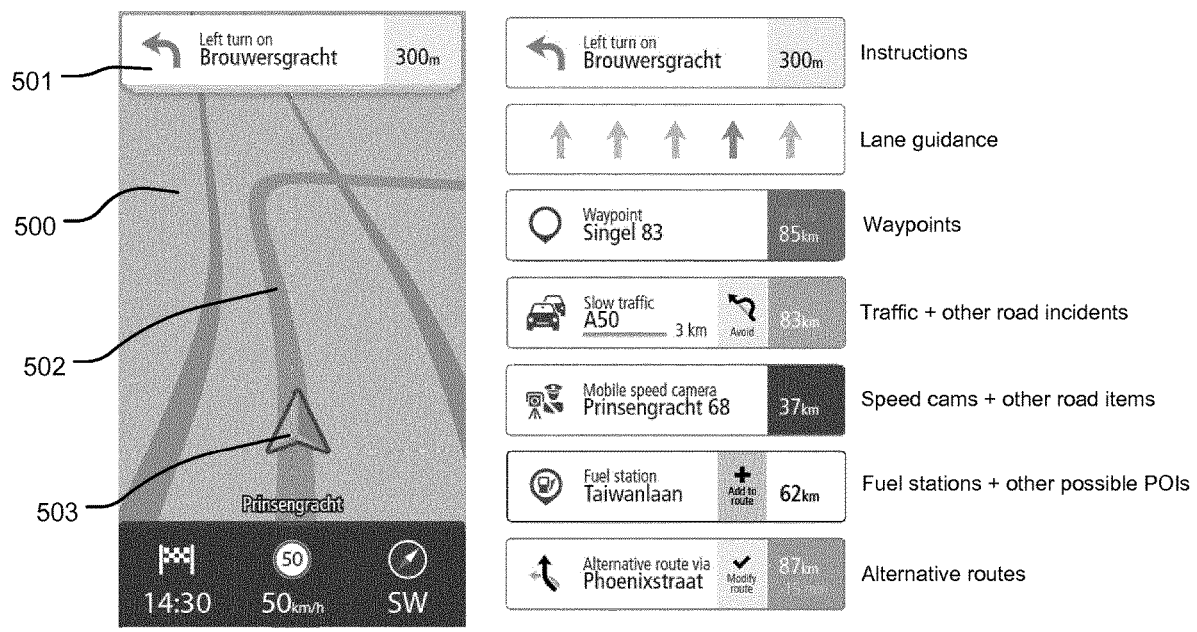
FIG. 5 shows an example of how a set of display cards may be used in accordance with embodiments of the invention to display upcoming information about a route to a user travelling along the route.

The What's Ahead Cards (or WAC for short) is a system of cards representing each important item that a user will encounter as they travel along a determined route, with display cards representing the individual items being sequentially displayed at the top of the display screen of a GUI as the navigation apparatus moves along the determined route, e.g. as in FIG. 5 which shows an example of a display card 501 (in this case an instruction card informing the user of the next instruction required to continue along the determined route, in this case "Left turn on Brouwersgracht" in 300 m) displayed at the top of the GUI and superimposed on top of the normal navigation guidance display 500 which includes a route line 502 indicating the determined route within the navigation map and a chevron 503 reflecting the current position of the navigation apparatus along the route. It will be appreciated that various other icons reflecting information such as the current speed, weather conditions, and estimated arrival time may also be displayed, typically at the bottom of the display as shown in FIG. 5. FIG. 5 also shows various examples of other cards that may be displayed to the user at appropriate points along the route. In general, the cards include a distance to the item alongside any additional associated information that might be relevant for the particular item. Indeed, it will be appreciated that in general the cards may include a number of different types, representing different types of item along the route.

Figure 6A:
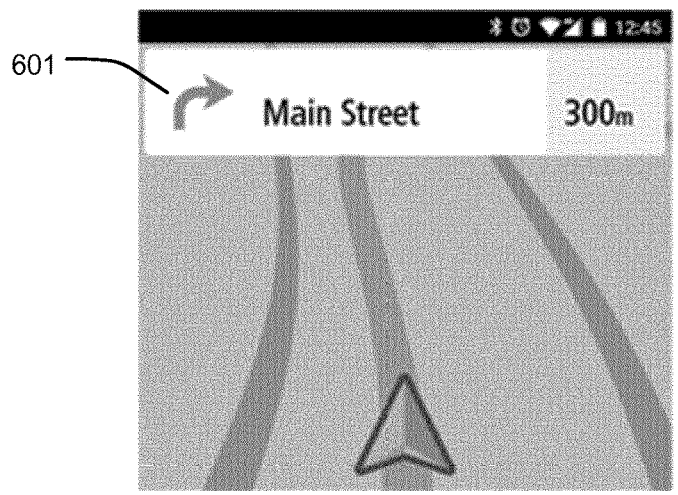
FIGS. 6A, 6B and 6C show examples of instruction cards that may be used in accordance with embodiments of the invention.
Figure 6B:
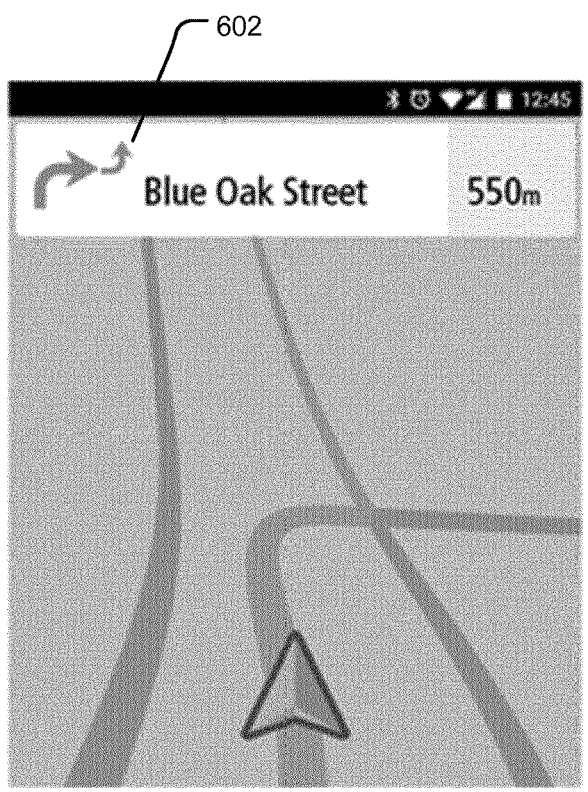
Figure 6C:
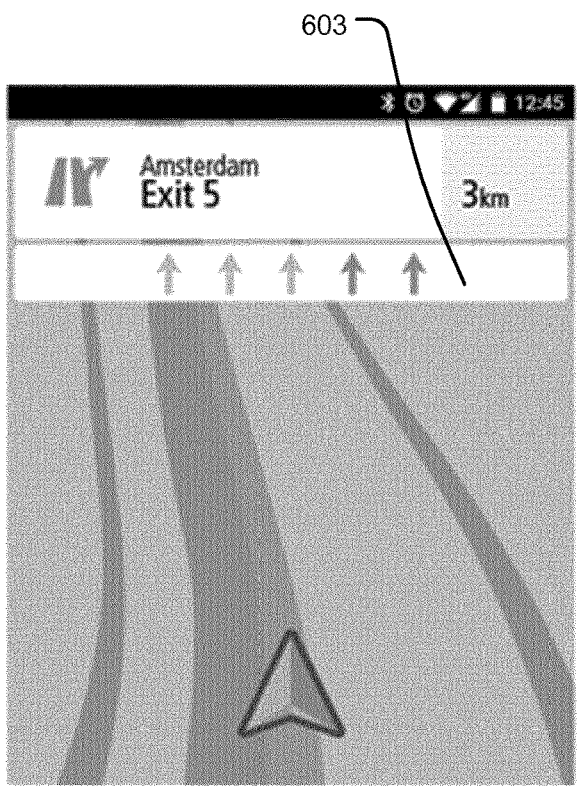

For instance, and in particular, some of the cards included within the stack are instruction cards for displaying information such as manoeuvre instructions (as in FIG. 5), lane guidance, an indication that the user is reaching a destination or waypoint associated with the route, or an indication that the user has arrived at the destination or waypoint. It will be appreciated that these instructions are associated with the determined route, and that these may thus be generated from the map data, e.g. when calculating the route. The data used to generate the instruction cards is generally stored in a repository, preferably as an ordered list of the required instructions along the route. Thus, as the navigation apparatus moves along the route, the repository is accessed to retrieve the next required instruction for display on a first portion of the GUI. The list of instruction cards stored in the repository is typically dynamic so that once a card has been displayed (and the instruction followed), that card may be removed from the list. Similarly, cards may be added into the list, particularly if the route changes, e.g. in the event that the user selects to add a new waypoint into the route (as described further below). The instruction cards thus provide the user with general navigation guidance while driving. Another example of a manoeuvre instruction card (in this case, to follow the road to the right in 300 m) is shown in FIG. 6A. As shown, and generally, the manoeuvre instruction card 601 is composed of one or more, and preferably all, of the following information: distance to manoeuvre point; street name; and manoeuvre icon (e.g. an arrow showing the path the user should take, with greyed out geometry of other streets in the crossing). When two instructions occur within a certain distance of each other, a mini-arrow 602 may be added to the first instruction to reflect that a second manoeuvre will happen shortly after completing it, e.g. as shown in FIG. 6B. Another example of an instruction card is a lane guidance card which may be displayed alongside the card showing the manoeuvre instructions in the event that lane guidance is required, e.g. when approaching an exit on a multi-lane roadway. A lane guidance card is a "mini" card (as discussed further below) and is always displayed together with and below the associated manoeuvre instruction (e.g. "Exit 5—Amsterdam"), as shown in FIG. 6C. The lane guidance card 603 displays the number of lanes present in the current stretch of the road with a highlight of the lane(s) that the user should take. Other examples of instruction cards include waypoint and destination cards indicating that a user is approaching (or has arrived at) a waypoint or destination along the route. For instance, when the navigation apparatus is approaching a waypoint or destination, a "reaching waypoint or destination" card may be displayed that is composed of one or more, and preferably all, of the following information: distance to location; address (or name in case of a POI or favourite); icon; and estimated time of arrival. Upon arrival, the "reaching waypoint or destination" card morphs into an "arrived to waypoint or destination" card which is composed of the address (or name in case of POI or favourite) and icon.

The stack of cards also generally includes information cards containing information about upcoming events of which the user may wish to be alerted such as alert items (speed cameras, speed zones, etc.), POI suggestions along the route (including fuel stations, parking, etc.), road incidents such as traffic jams or accidents, and alternative route suggestions. In general, an information card will display an icon, or text, indicating the type of event alongside the distance to the event. Some of the event data used to generate the information cards may be determined from the map data, e.g. locations of fuel stations, parking, etc. However, preferably, the event data is received from a server and includes dynamic or live data concerning the current road conditions (e.g. traffic jams, weather conditions, etc.). As the event data is received, it is generally stored in a repository as an ordered list, similarly to the instruction data, so that as the user progresses along the route, the next or upcoming event may be displayed at an appropriate time. The instruction and information cards may generally be stored in a single list, representing the sequence of all of the items along the route, or may be stored as separate lists. Various examples of information cards and the display thereof will be described herein.

Thus, as the navigation apparatus travels along the determined route, the display is updated to show the next items, e.g. so that a first portion of the GUI shows the next manoeuvre and a second or further portion of the GUI shows the next upcoming event(s) that the user will encounter. The number of items (i.e. cards) that are displayed, and the order in which the first and second portions of the GUI are displayed may generally be determined according to a number of suitable criteria to ensure that the information is presented to the user in a natural and concise manner, i.e. to provide the user with the desired information, but without overloading the display and potentially confusing the user.

For instance, where there is only one upcoming item, the associated information, or display card, is generally displayed at the top of the screen, as a primary card 701 as shown in FIG. 7A. In this case, the primary card 701 will typically comprise the next instruction card in the stack, as the next instruction is generally always displayed on a first portion of the GUI (i.e. so that once an instruction has been followed, that card is removed from the stack, and the next instruction card in the stack is displayed in its place). Generally only the (singular) next instruction card in the stack is displayed, except for in the case where lane guidance is required, in which case the lane guidance card may be displayed alongside the corresponding manoeuvre instruction. However, in some other cases, multiple instruction cards may be displayed together e.g. a next manoeuvre instruction and an approaching waypoint. Similarly, as the user progresses along the route, information cards representing events of potential interest may also be displayed alongside the next instruction card. Such information cards are typically only displayed (alongside the next instruction card) when it is determined that the navigation apparatus is within a predetermined threshold distance of the event, which predetermined threshold distance may be selected appropriately based on the type of event to allow the user sufficient time to process the information and react accordingly. Thus, when it is determined that the navigation apparatus is approaching one or more event for which there is an associated information card in the stack, two or more cards may be simultaneously on the screen, e.g. as shown in FIG. 7B. In such cases, the order in which the two or more cards are displayed on the GUI is determined based on the distance to that item, in particular so that the next item is displayed closest to the chevron (i.e. towards the bottom of screen). Thus, FIG. 7A shows an example of a typical situation where there are no upcoming events e.g. within a predetermined distance from the current position of the navigation apparatus, such that only the next route instruction is displayed at the top of the display as a primary card 701. However, as the navigation apparatus moves along the determined route, upon determining that there is an upcoming event, or a further instruction, a secondary card 702 is displayed on the GUI alongside the primary card 701, e.g. as shown in FIG. 7B. In general, the primary card 701 is used to display the next item (i.e. instruction or event) in the route, and is displayed underneath the secondary card 702 which is used to display the following item, reflecting that the item associated with the primary card 701 is closer to the current position of the navigation apparatus (as represented by the position of the chevron 503) than the item associated with the secondary card 702. Thus, the display is generally dynamic and the cards will be updated and shifted in position as the user progresses along the route. For instance, and as will be explained below in relation to various specific examples, as the navigation apparatus moves past the item currently displayed as the primary card, the next item in the stack, which would typically be currently displayed as the secondary card, is then moved onto the primary card position, with the next item after that then being displayed as the secondary card, and so on.

Furthermore, cards may generally be displayed in two sizes: 'normal' and 'minimised', e.g. as shown in FIG. 7C. Minimised ("mini") cards may be used to represent (temporary) events or items that are valid along the road segments in which the user is currently travelling, such as lane guidance, a restricted speed zone, or a traffic jam, etc. For instance, if the navigation apparatus is approaching a restricted speed zone, the associated card may initially be displayed in normal size, as shown in FIG. 7B. However, once the navigation apparatus has entered the restricted speed zone, the portion of the GUI used to display this information may be modified to display a mini card, as shown in FIG. 7C. The mini card 703 may then be displayed for the duration of the time for which the navigation apparatus is experiencing the associated event or item (or until a further item is to be displayed in its place). In this case, since the user is currently experiencing the event (i.e. so that the distance to the event is effectively zero), the mini card is typically be displayed underneath the primary card 701 (or any other cards that may be displayed), closest to the chevron.

In general, the number and order of cards that are displayed may be based on various suitable selection criteria. Furthermore, the form of the display may change depending on whether the display is in portrait or landscape mode. For example, and by way of illustration only, in portrait mode, the following set of display rules may be used to determine which cards are displayed:

Display Rules for Portrait Mode
1. Always show one instruction card at a time (the next on the stack based on distance), except: lane guidance cards are shown together with the associated instruction card;
2. A maximum of three cards can be displayed at any given time;
3. A maximum of two normal size cards can be shown together;
4. A maximum of two minimised cards can be shown together;
5. Normal cards have priority over minimised cards;
6. Minimised cards, in an example, follow this priority: lane guidance; speed zones; traffic jams;
7. If minimised, speed zone and traffic jam cards are shown at the same time, the one with the closest ending point is shown closest to the chevron.

Figure 9:
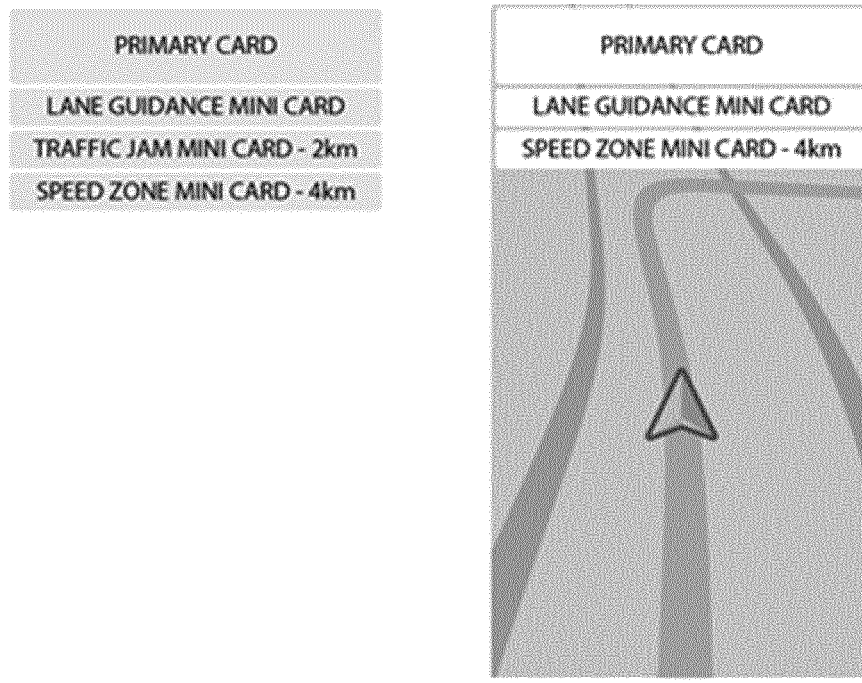
Figure 10:
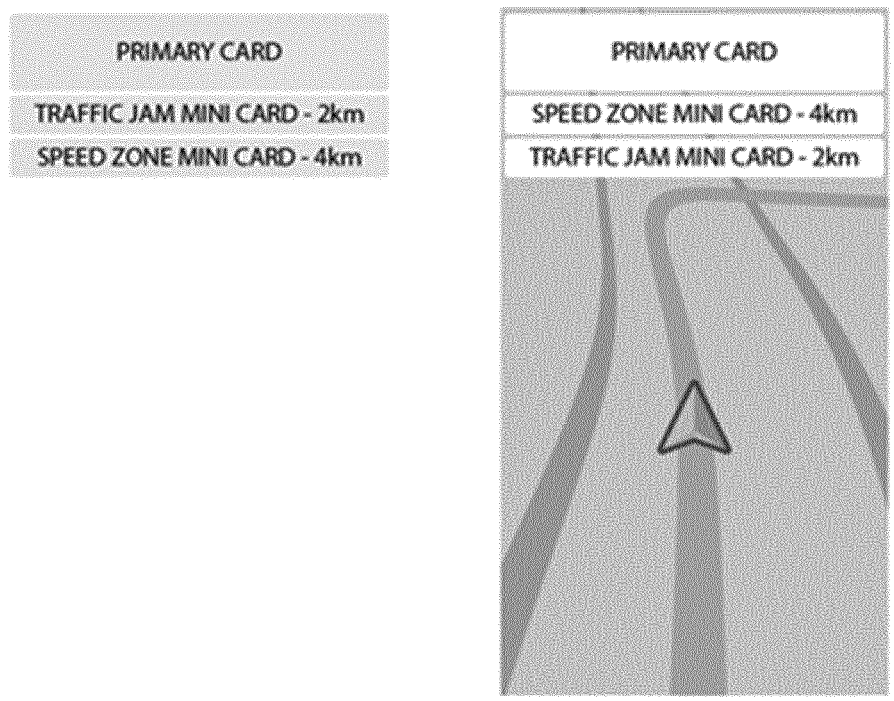

To illustrate further, some examples of displays based on these display rules are shown in FIGS. 8, 9 and 10. For instance, FIG. 8 illustrates a first example for a situation where there are currently two normal cards and three mini cards that are available for display. In this example, the three mini cards comprise a lane guidance mini card, a traffic jam mini card and a speed zone mini card. Thus, according to the display rules presented above, the two normal cards are shown as primary and secondary cards (e.g. as in FIG. 7B) along with one of the mini cards underneath the primary card (as in FIG. 7C). In this example, the mini card that is displayed based on the priority rules is the lane guidance mini card. FIG. 9 illustrates a second example wherein there is now one normal card and three mini cards. In this case, the normal card will be displayed as a primary card (as in FIG. 7A) alongside two of the mini cards selected based on the priority rules. FIG. 10 shows a third example wherein there is one normal card and two mini cards. Thus, all of the cards may be displayed. As shown, the primary card is displayed at the top of the GUI, with the two mini cards displayed underneath arranged according to their distance so that the mini card with the closest ending point (in this case the traffic jam mini card, ending in 2 km) is displayed closer to the chevron than the mini card associated with the speed zone (which lasts for a further 4 km).

In landscape mode (not shown), the layout may be changed to place all of the information into a single horizontal layout and all of the cards may be displayed as the same vertical size (which, in an example, is identical to the minimised size of cards on portrait view). Note that even where all cards are displayed as the same vertical size, cards retain their "minimised" state when necessary e.g. for the purposes of applying the display rules (so that a traffic card will morph from a "normal" card into a "minimised" card layout once we enter the traffic jam). By way of example, in landscape mode, the following set of exemplary rules may be applied to display cards:

Display Rules for Landscape Mode
1. A maximum of two cards can be displayed at any given time
2. A maximum of one card in "minimised" state can be shown at any given time
3. Normal cards have priority over minimised cards
4. Minimised cards follow the same hierarchical priority as in portrait view.

Thus, the user is provided via the display screen with a sequence of display cards representing items that are relevant to the route along which they are travelling, and the order and number of which have been selected to provide the desired information to the user in a clear and concise format on the display.

Figure 11:
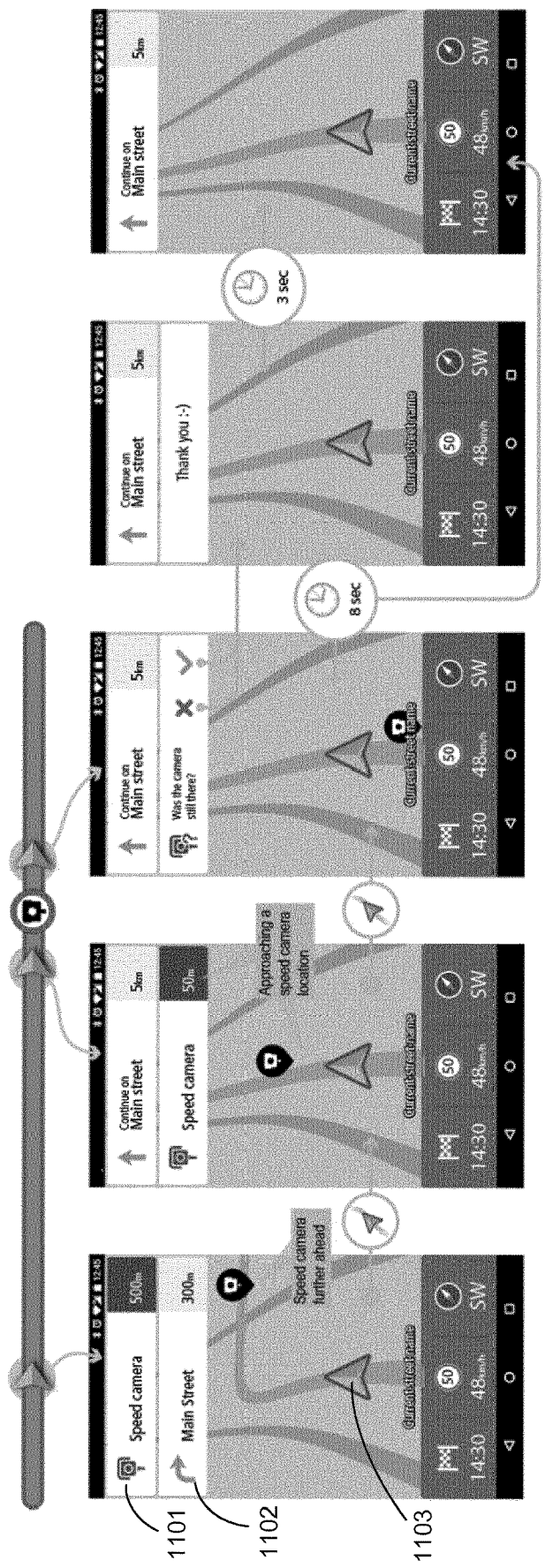
FIG. 11 shows an example of an information card indicating that the user is approaching a speed camera.
Figure 12:
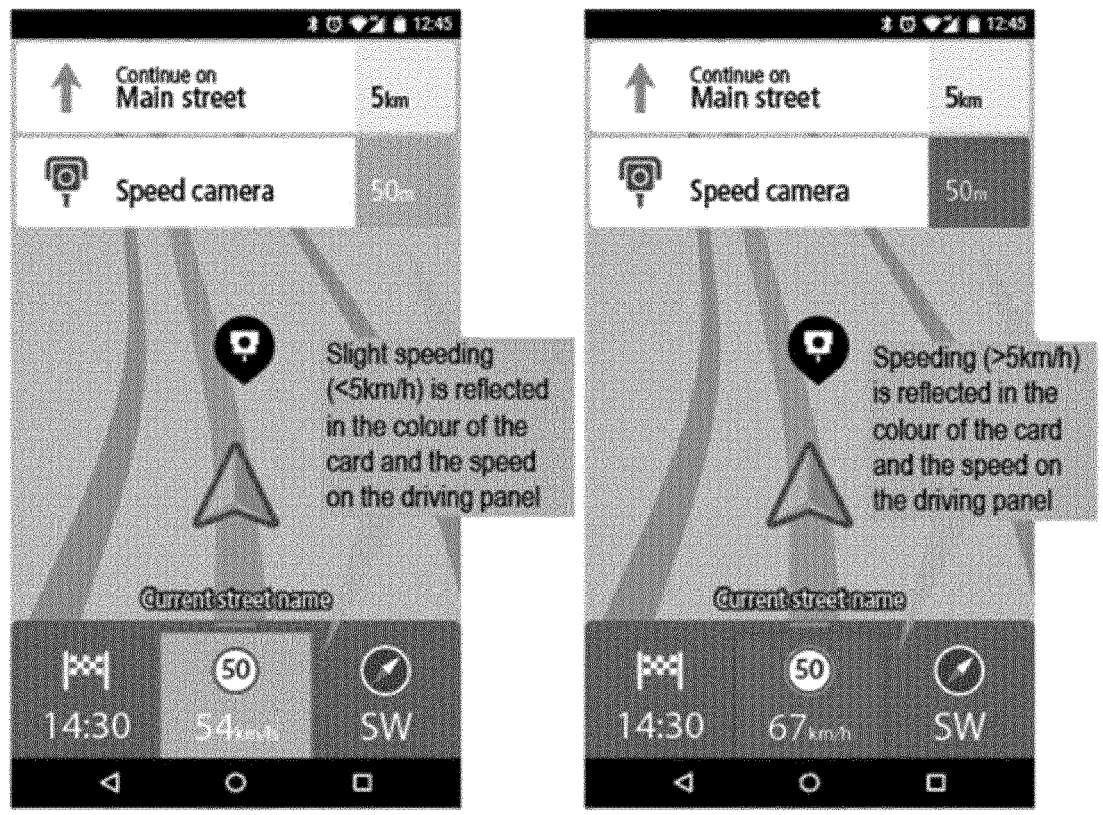
FIG. 12 shows how an information card like that in FIG. 11 may be used to indicate whether a user is speeding.

As explained above, there are various different types of cards that may be displayed to the user in the above-described manner including instruction cards of the type shown in FIGS. 6A-6C, and also information cards that provide the user with specific information relating to events along the route of which the user may wish to be alerted. These include, among others, cards reflecting alert items (speed cameras, speed zones, etc.); POI suggestions along the route (including fuel stations, parking, etc.) that the user may wish to add into the route; upcoming road incidents such as traffic jams or accidents; and alternative route suggestions. It will be appreciated that many of these events are temporary and that such information cards may thus be generated from data received from an external server, reflective of the current road conditions and based on the current position of the navigation apparatus. For example, FIG. 11 shows an example of the evolution of the GUI display as the navigation apparatus approaches and moves past a speed camera. In the first panel (on the left hand side), which shows the display at a first position along the route, as indicated on the route line in FIG. 11, which in this case is 500 m ahead of the position of the speed camera, a "Speed Camera" information card 1101 is displayed at the top of the GUI alongside the next manoeuvre instruction card 1102 (in this case, to turn right onto Main Street in 300 m). Because the next manoeuvre instruction occurs before the speed camera, the instruction card 1102 is the current primary card and is displayed underneath the secondary Speed Camera card 1101 on the GUI, i.e. so that the instruction card 1102 is closer to the chevron 1103 than the Speed Camera card 1101. As the navigation apparatus continues along the route, and after performing the first required manoeuvre, the associated instruction card is removed from the stack and the next instruction card is displayed in its place (in this case, instructing the user to continue on Main Street for 5 km). However, at this point, the speed camera is now only 50 m ahead of the current position of the navigation apparatus whereas the next instruction is not required for a further 5 km, and so the order in which the cards are displayed is changed to reflect this—thus, the Speed Camera card 1101 is moved to the primary card position and is now displayed closer to the chevron 1103 than the instruction card. Once the user passes the speed camera, a new temporary card prompting the user to answer whether or not the speed camera was still there may be displayed and the user can indicate accordingly so that the event data stored on the server can be updated. After a user interaction, or after a set time interval, the display returns to the normal navigation view, with (only) the next instruction card displayed at the top of the display, as there are now no upcoming events. As shown in FIG. 12, the Speed Camera card 1101 may e.g. be highlighted (and particularly the portion of the card showing the distance to the speed camera may be highlighted) to indicate that the user is speeding. In this way, speeding may be reflected using the display card, as well as by colour of the card, and also in the colour of the map marker and the speed on the driving panel. The degree of speeding can be shown using different colours e.g. amber for slight speeding (e.g. 54 km/h in a 50 km/h zone) or red for more severe speeding (e.g. 67 km/h in a 50 km/h zone).

Figure 14:
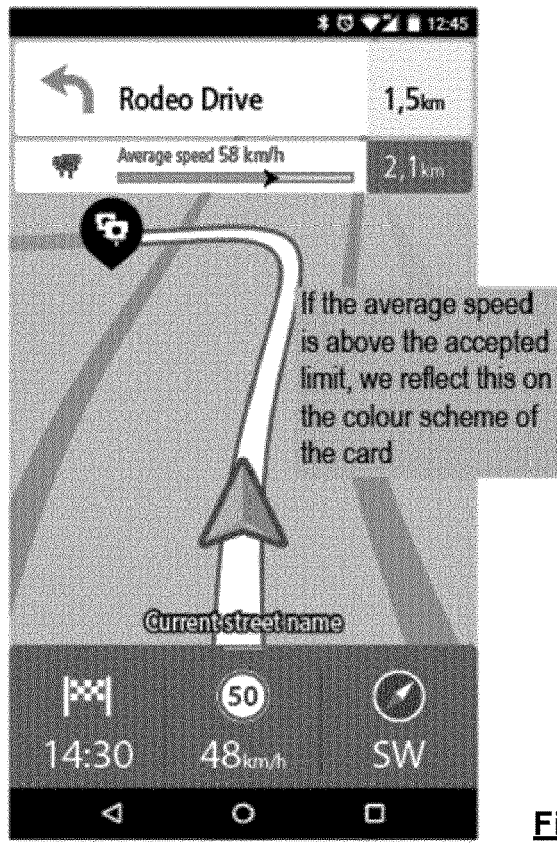
FIG. 14 shows how an information card like that in FIG. 13 may be used to indicate whether a user is speeding.
Figure 13:
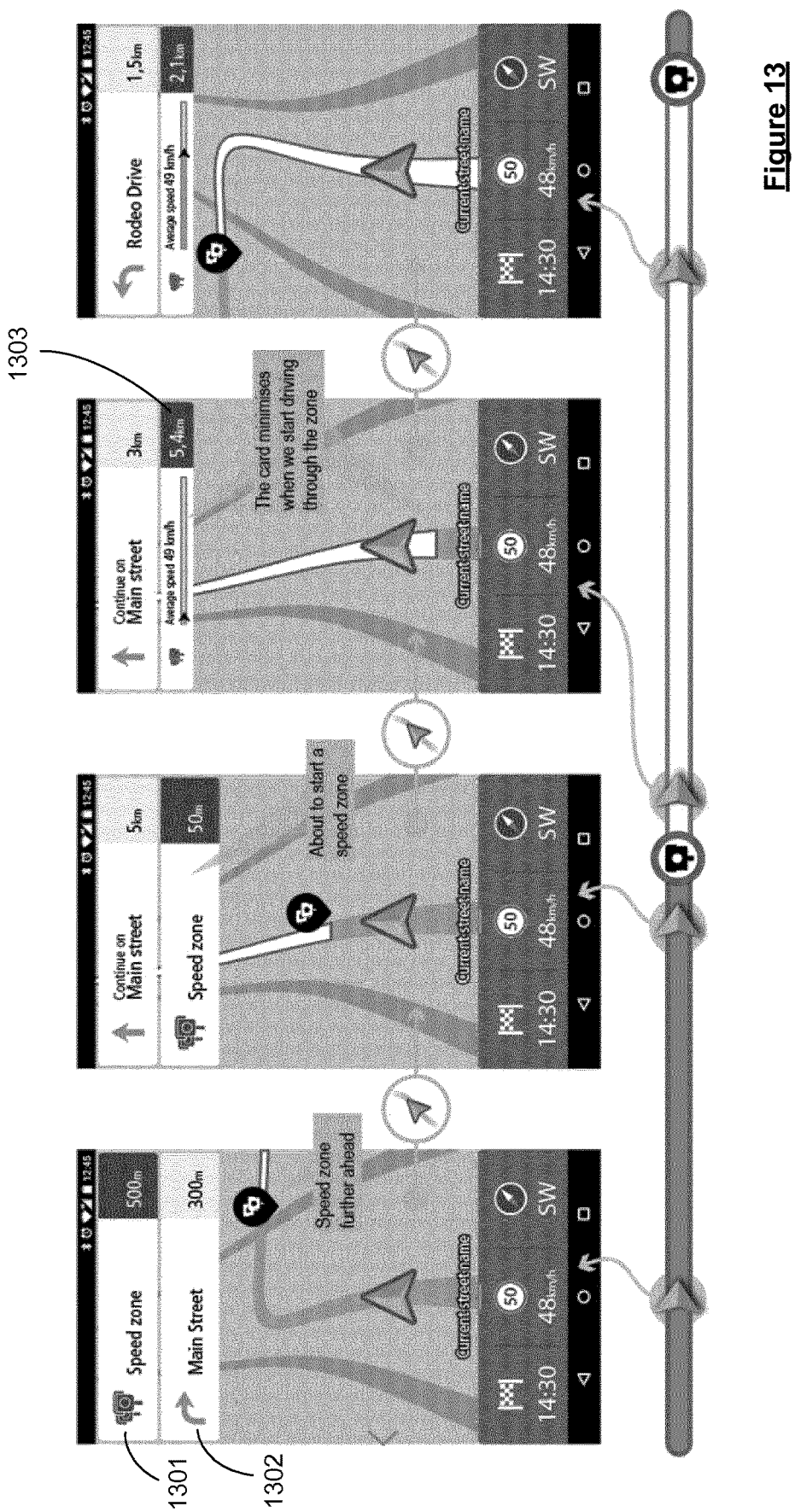
FIG. 13 shows another example of an information card here indicating that the user is approaching a restricted speed zone.

FIG. 13 shows another example in which a navigation apparatus is approaching a restricted speed zone. The first panel (on the left hand side) shows the display at a first position where the navigation apparatus is 500 m ahead of the restricted speed zone, whereas the next manoeuvre instruction is required in 300 m. Accordingly, as above, the Speed zone card 1301 is displayed above the next manoeuvre instruction 1302 on the display to reflect this. However, as the navigation apparatus approaches the restricted speed zone, so that this becomes the next item along the route, the order in which the cards are displayed is changed to reflect this. Once the navigation apparatus enters the restricted speed zone, the display is modified to show a mini Speed zone card 1303 showing the length of the speed zone and the progress of the navigation apparatus through the speed zone. Again, in the case of speeding, the mini Speed zone card 1304 may be highlighted appropriately, e.g. as shown in FIG. 14. Once the navigation apparatus has passed the speed zone, the mini card is removed from the display (and indeed from the stack of cards).

Figure 15:
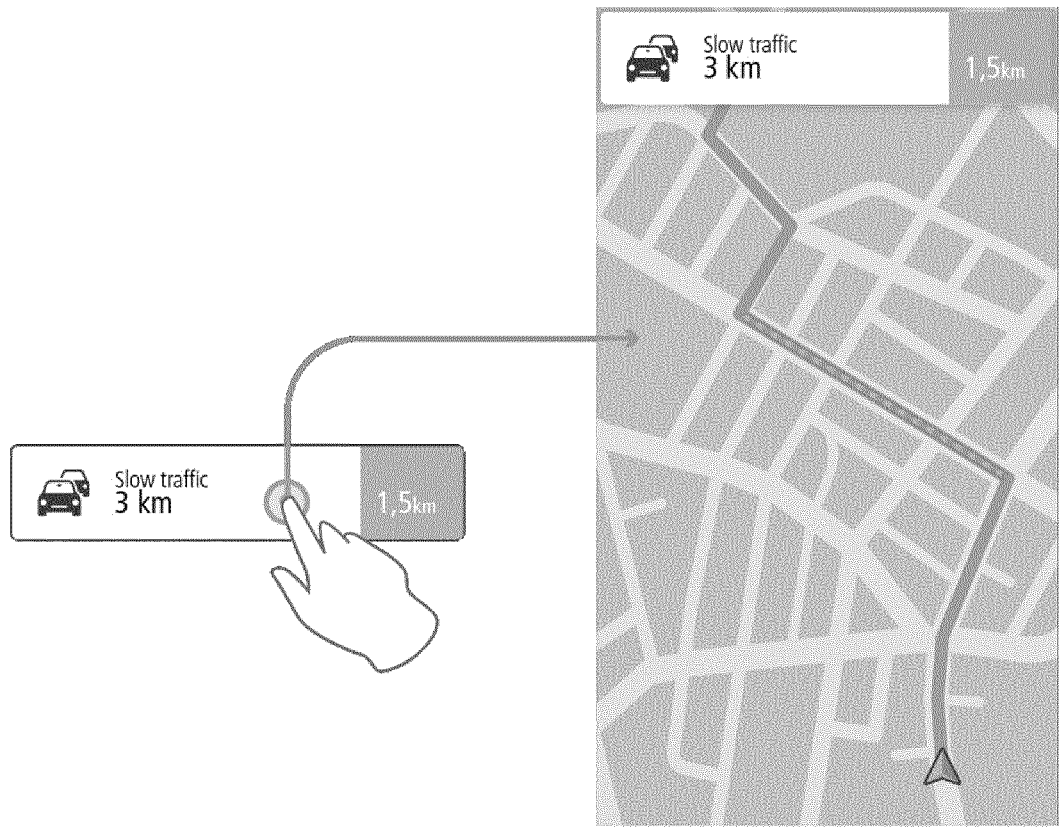
FIGS. 15, 16, 17, 18, 19 and 20 illustrate user interactions with the display cards.
Figure 16:
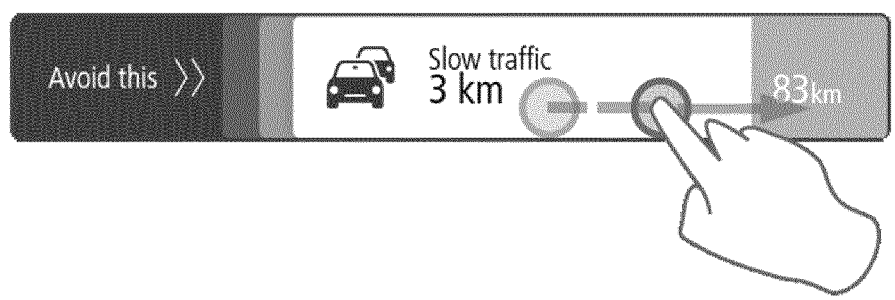
Figure 17:
Figure 18:
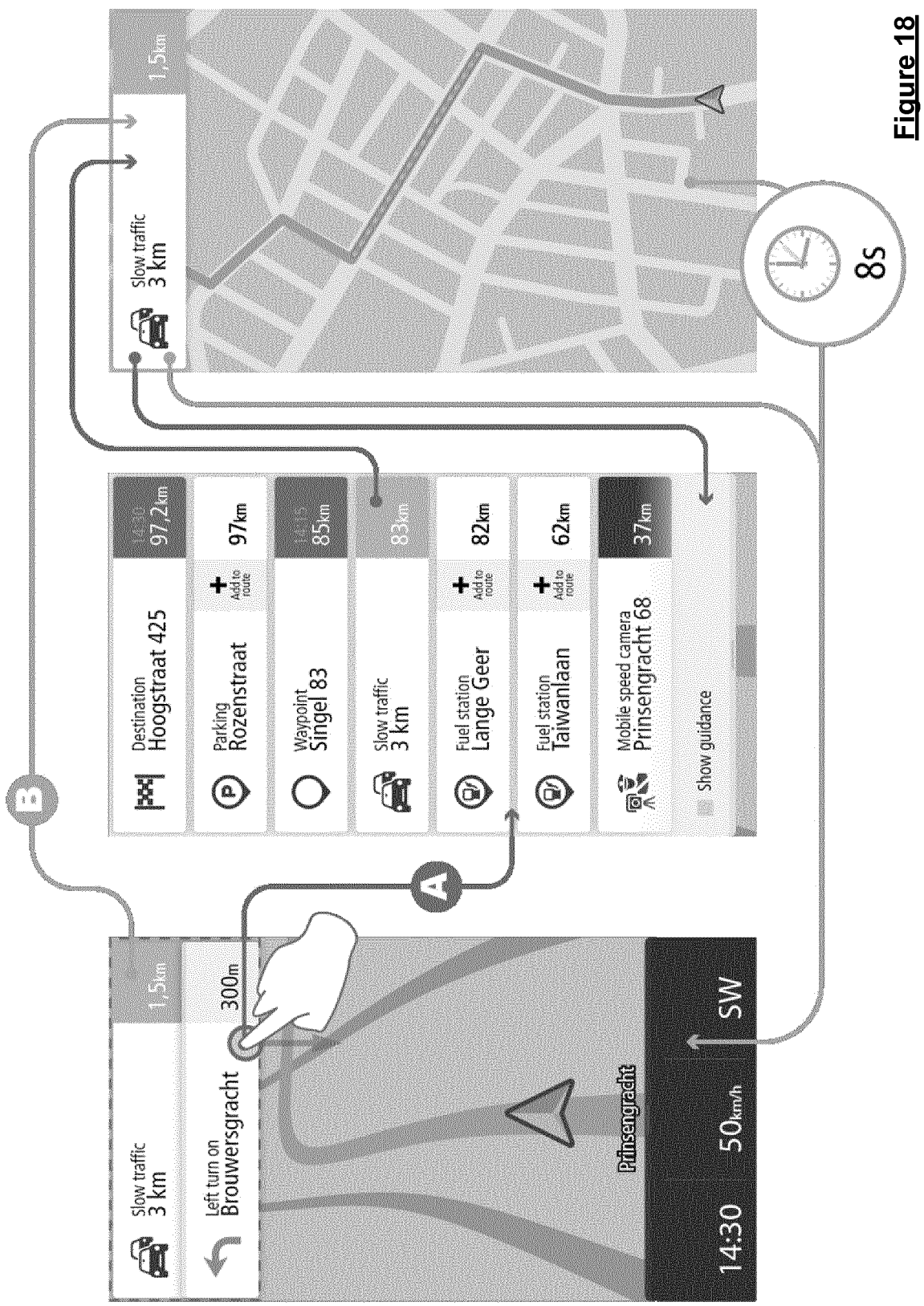

As well as displaying information about the upcoming events and manoeuvres along the route, the display cards on the GUI also generally allow for user interaction. For example, a user may tap on an area of a card in order to show more details of the associated event or instruction, e.g. as shown in FIG. 15, wherein tapping on the card changes the display from the normal navigation view into a top down 'look ahead' view showing the details of the event (in this case the location of a region of slow traffic). Similarly, by utilising other gestures, e.g. swiping a card as shown in FIG. 16, it is possible to provide other user interactions. For instance, in the event that a traffic jam, or some other event is indicated, the user may swipe the card in order to dismiss this event and cause the system to attempt to calculate an alternative route to the destination. Furthermore, the entire stack of cards (i.e. the complete current set of instructions and events along the route) can be opened, for example, by tapping on any of the cards currently displayed, or e.g. swiping the cards downwards as illustrated in FIG. 17. As shown in FIG. 17, at the top of the open stack 1701, a panel 1702 is displayed with the destination address (or name in case of a favourite place), distance to destination and the ETA. The open stack of cards 1701 displays both instruction cards and route cards mixed into a list ordered according to distance, with the closest item being at the bottom of the screen. Minimised cards are not generally visualised in the open stack. The user can filter the list e.g. to show only route cards. The stack can then be closed, for example, by tapping on a back button; or scrolling the cards up until the next card is visible at the bottom of the screen, and continue scrolling/dragging up. The stack may also close automatically after 15 seconds (or another set amount of time) of not interacting with the screen, so that the display automatically returns to the navigation view. When the stack is open, tapping on any of the cards will open up a panel focused on the location of the associated event/instruction with information about the item (e.g. as shown in FIG. 18). When focused on a location, closing the panel will bring the user back to the driving view. Alternatively, if there is no interaction with a selected item after 15 seconds (or another set amount of time), the display automatically reverts to the navigation guidance view with the display cards displayed at the top of the GUI.

Figure 19:
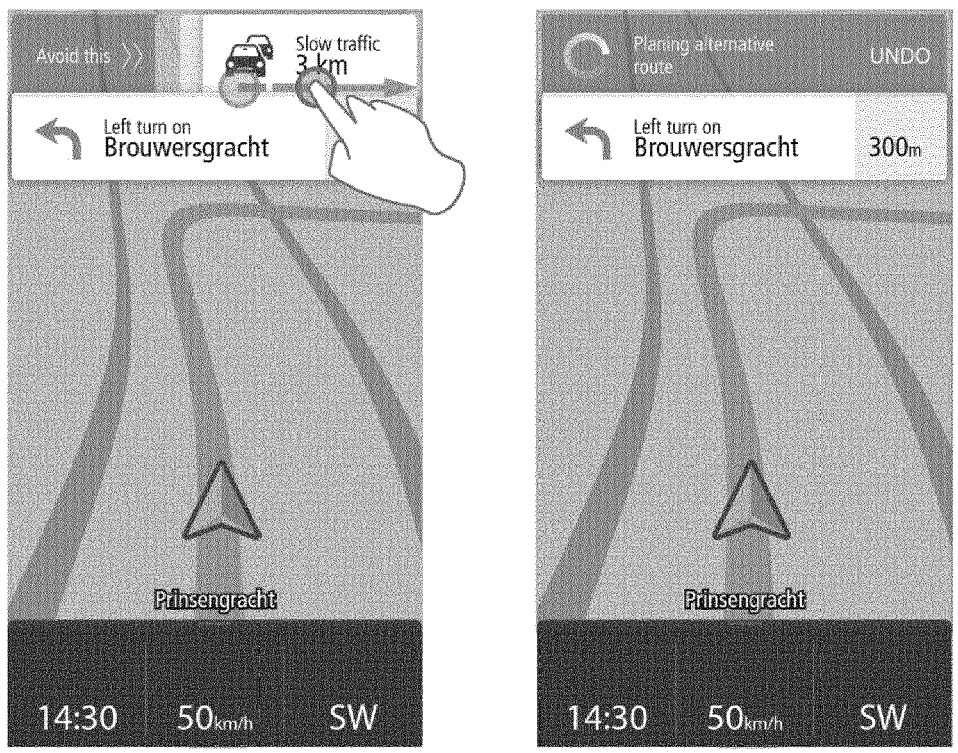
Figure 20:
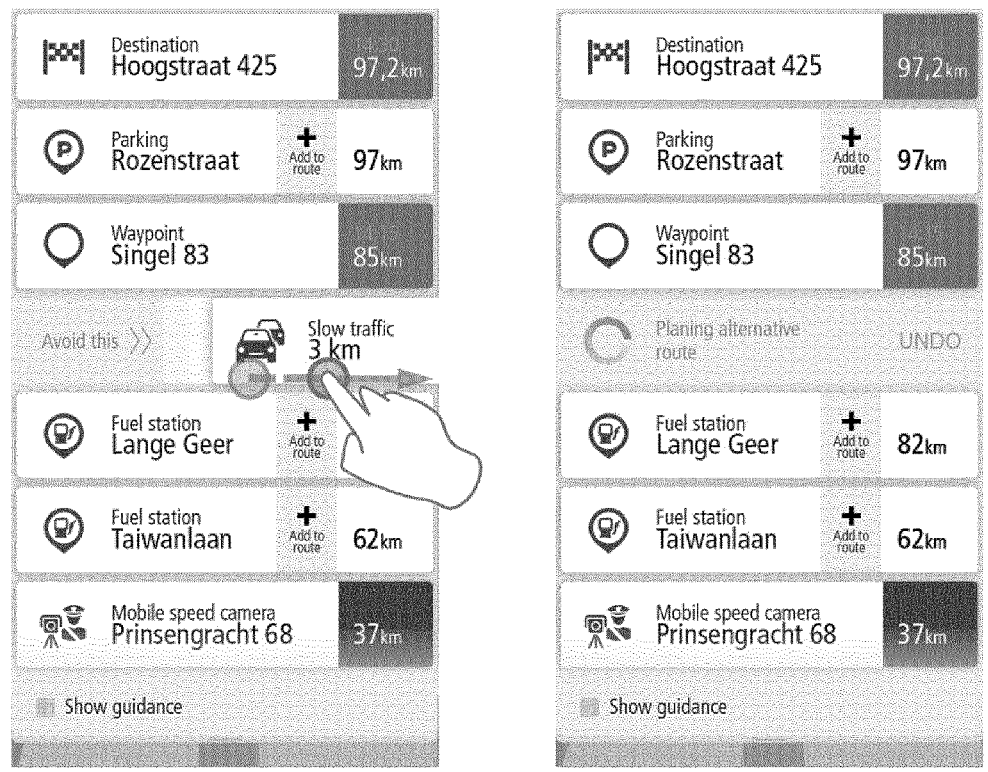

As mentioned above, the interactions with the cards may also be used to alter the determined route. For instance, FIG. 19 illustrates schematically how a user may swipe on a card in order to avoid an upcoming event (in this case a section of slow traffic) and cause the navigation apparatus to calculate an alternative route through the navigation network. This may be done during the normal navigation guidance view (i.e. with a closed stack, as shown in FIG. 19), or when the stack is open, as shown in FIG. 20.

Figure 21:
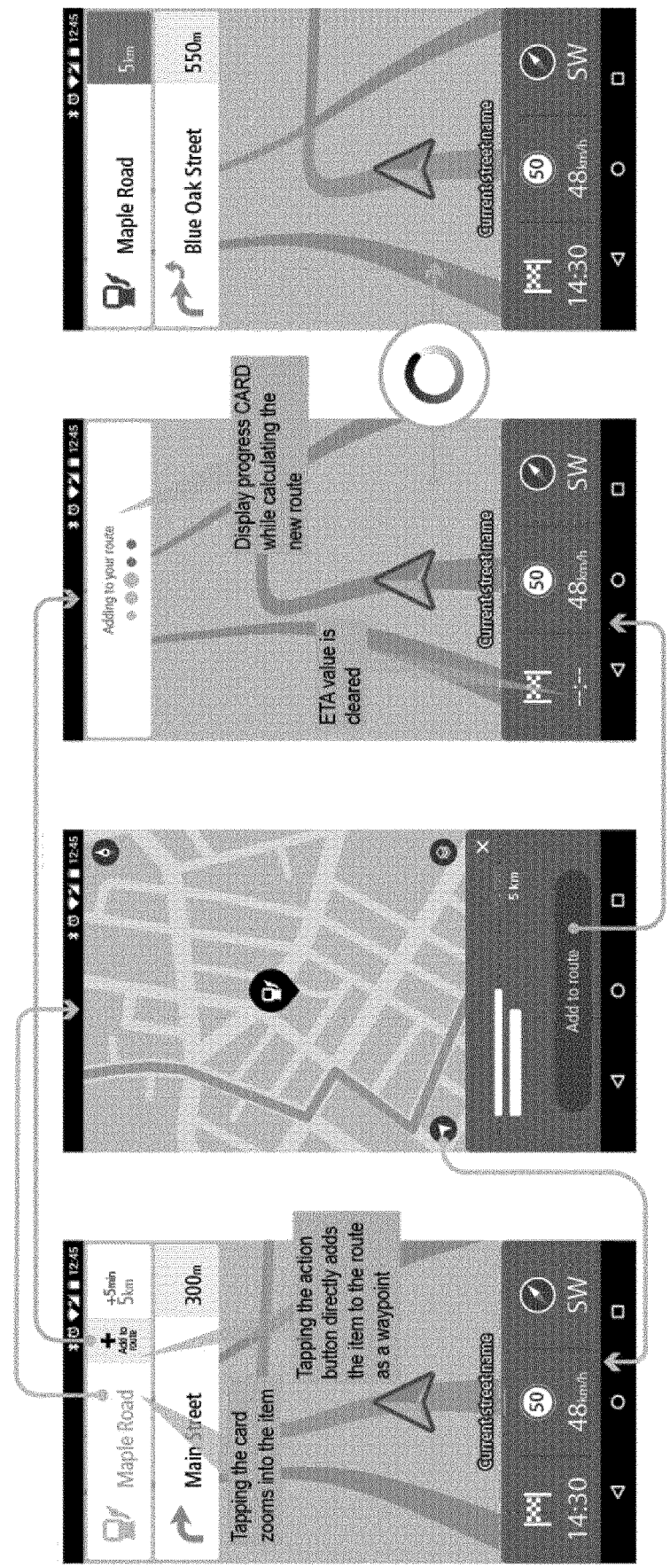
FIG. 21 illustrates how suggested POIs may be displayed and added into the route.

The cards may also include specific action buttons for allowing user interaction (e.g. so that a user can tap on the action button to perform a desired action). For instance, another type of information card is a card that suggests a possible POI that the user may wish to add into the route. These suggestion cards may be visually distinctive to differentiate them from the other cards which are actually part of your defined route (e.g. greyed out icon). As shown in FIG. 21, the suggested POI card is composed of an icon and text indicating the nature of the POI, the distance to the POI, and an action button allowing the suggested POI to be added into the route i.e. as waypoint. When added, the cards become waypoint cards and are further treated as such. If the card is tapped before being added, the map focuses on the specific location and we display further information about the POI and the possibility to add to the route.

Figure 22:
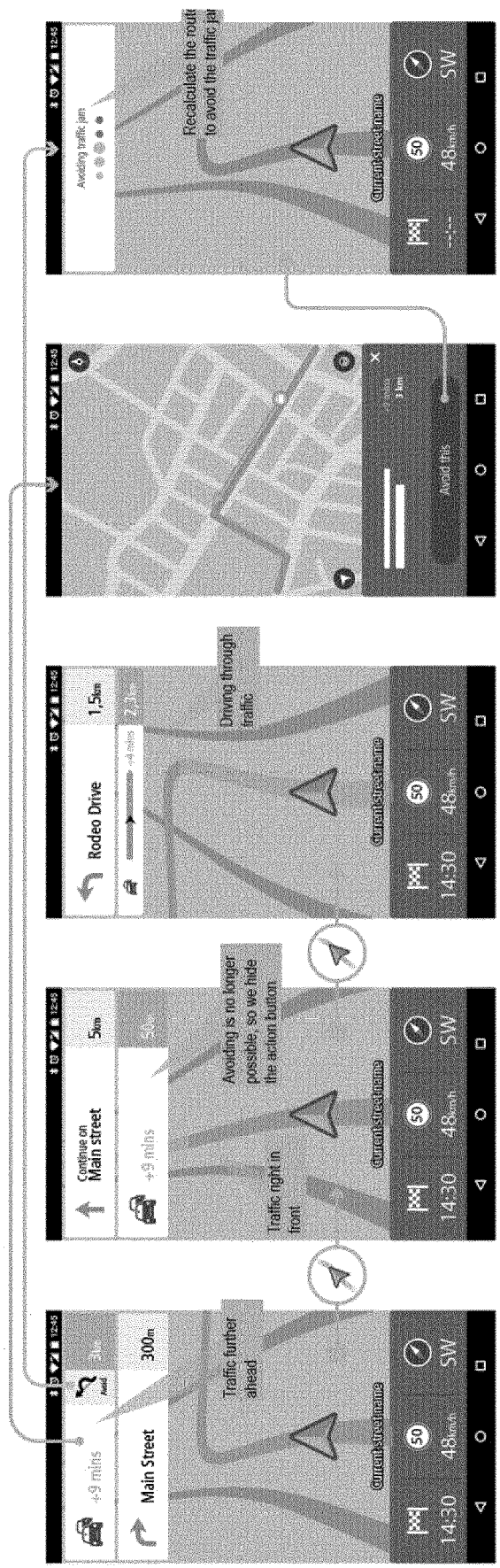
FIG. 22 illustrates how events such as traffic jams may be indicated using the display cards.

Another type of card is a road incident card informing the user about particular conditions along the route which could affect the traffic flow, such as traffic jams, accidents, etc. Again, these cards may be composed of an action button allowing a user to select to recalculate the route to avoid the jam, e.g. as shown in the left panel of FIG. 22 which illustrates an example of a user approaching a traffic jam. Thus, as shown in FIG. 22, when the traffic jam is at a certain distance or less from the user's current driving position, the information sound can be played and a "Traffic Jam" card is displayed, initially as a secondary card as the next instruction occurs before the traffic jam. (When the user gets closer to the jam, where it's no longer possible to avoid it, the action button may be hidden, or locked.) When the user is about to start driving through the traffic jam, so that the traffic jam is now the next item along the route, the Traffic Jam card slides to the position of the primary card and the next manoeuvre after the traffic jam is displayed as a secondary card. Once the user starts driving through the traffic jam, the card is minimised. If the card is tapped the map focuses on the specific location and any further information about the traffic jam is displayed (including the possibility to avoid it if appropriate). Traffic jam cards are generally composed of the following information: traffic severity colour; distance to start of jam; time delay due to the jam; icon; ETA; and action button to avoid the jam (recalculate a route around the traffic jam). Mini traffic jam cards are composed of the following information: traffic severity colour; icon; visual representation of progress through the traffic jam; remaining time delay due to the jam; and distance to the end of the jam.

Figure 23:
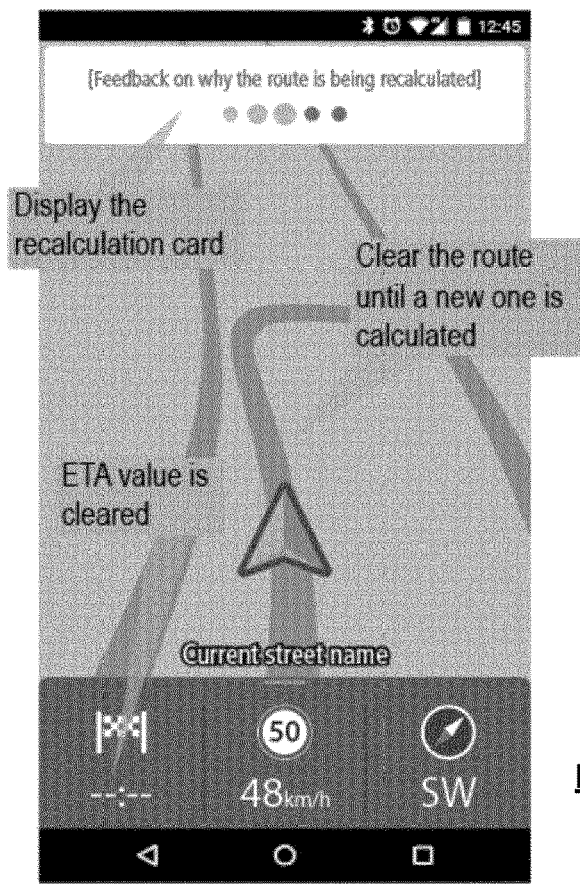
FIG. 23 shows an example of a progress card.

When the system is recalculating a route while already in the driving view, e.g. after choosing to avoid a traffic jam, or adding a waypoint to the route, a "Progress" card may be displayed, which shows a looping animation to reflect that the route is currently being recalculated, e.g. as shown in FIG. 23. While the system is recalculating a route, the previous route and ETA values may be cleared.

An example of a complete route, and associated stack of cards, will now be described with reference to FIGS. 24A-24G, to illustrate how the different cards are displayed, and in what order, as the user traverses the route and encounters various different types of road junctions (requiring different instructions) and events. Each of FIGS. 24A-24G collectively show the screens that will be displayed to a user—labelled as A to AB—as they traverse the displayed route (shown above the screens in each of FIGS. 24A-24G). It will be appreciated that FIGS. 24A-24G do not necessarily represent real road data and are merely provided to illustrate the general techniques presented herein. Similarly, any distances of examples given here are not intended to be limiting, but merely illustrate an example of how the stack of cards may be utilised and how the display may change along the route. FIGS. 24A-24G thus illustrate some general scenarios of the behaviour of cards along the illustrated route.

Figure 24A:
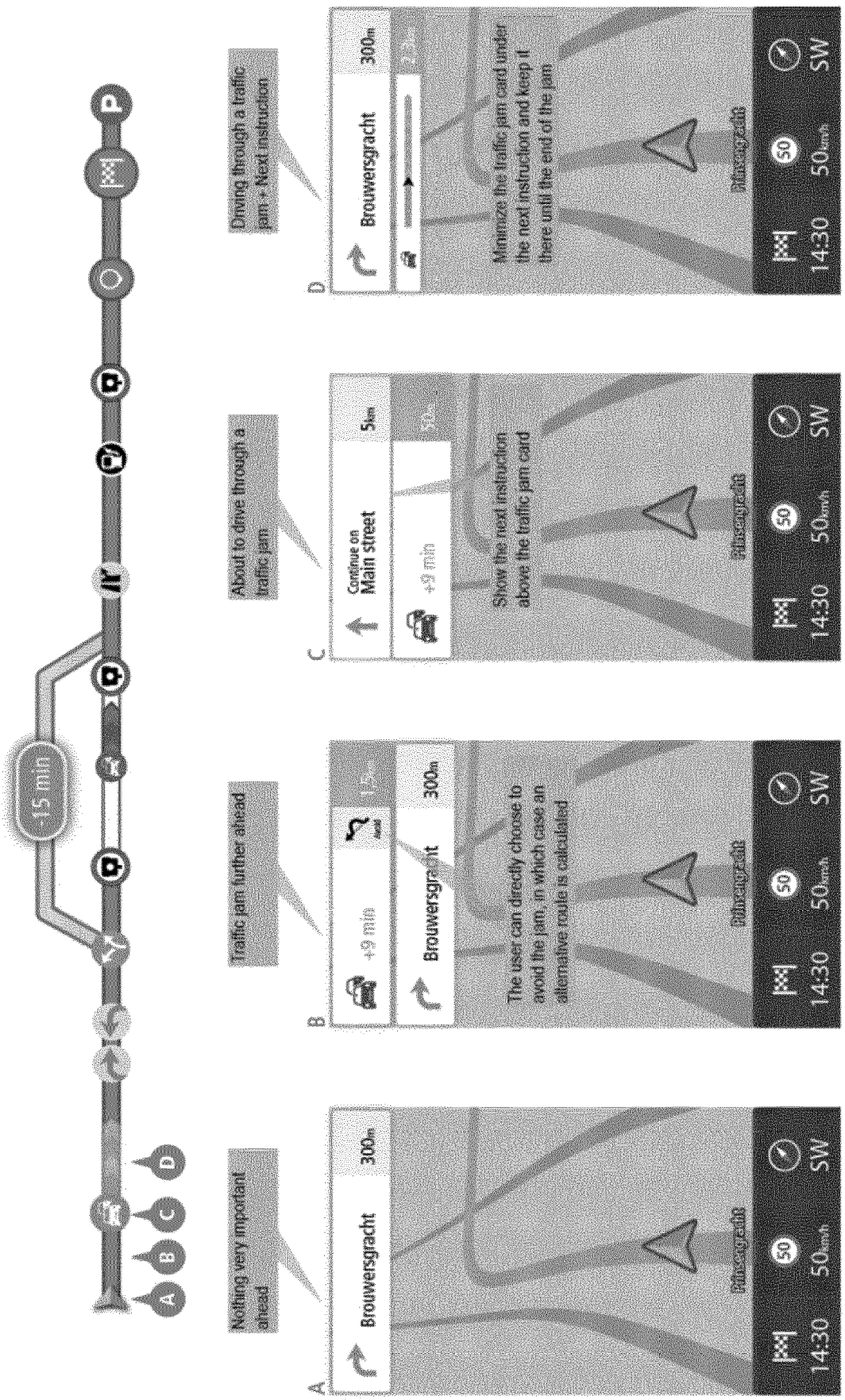
FIGS. 24A to 24G show an example of a complete route, and associated stack of cards displayed to the user as they progress along the route.

Initially, as shown in screen A of FIG. 24A, there are no upcoming events of interest and the display thus simply shows the next manoeuvre required to continue along the route, in this case to follow the road to the right in 300 m. For the example shown here, the first event in the stack of cards is a traffic jam. Thus, as the navigation apparatus progresses along the route, and approaches the traffic jam, a portion of the display is modified to include a Traffic Jam card indicating to the user that they are approaching a traffic jam, and indicating the distance to the traffic jam. Thus, as shown in screen B, which represents the display when the traffic jam is 1.5 km ahead of the position of the navigation apparatus along the determined route, a Traffic Jam card is added at the top of the display. In this example, because the traffic jam is further ahead than the next instruction, the instruction card is displayed below the Traffic Jam card. (As explained above, the traffic jam card includes an action button allowing for the user to interact with the card to calculate an alternative route to avoid the traffic jam. However, in this example, the user does not choose to do so and continues along the determined route). After the user has followed the first instruction, the first instruction card is removed from the stack and the next instruction card (here to continue along Main Street for 5 km) is displayed, e.g. as shown in screen C of FIG. 24A. As the next instruction is now further away than the traffic jam, which is now only 50 m ahead, the order in which the cards are displayed is changed so that the Traffic Jam card is moved closer to the position of the chevron, into the 'primary card' position (e.g. as shown in FIG. 7B), below the next instruction card (in the 'secondary card' position). Screen D shows the display as the user is travelling through the traffic jam, wherein a mini card for the traffic jam is now displayed alongside the next instruction card showing the progress of the user through the traffic jam.

Figure 24B:
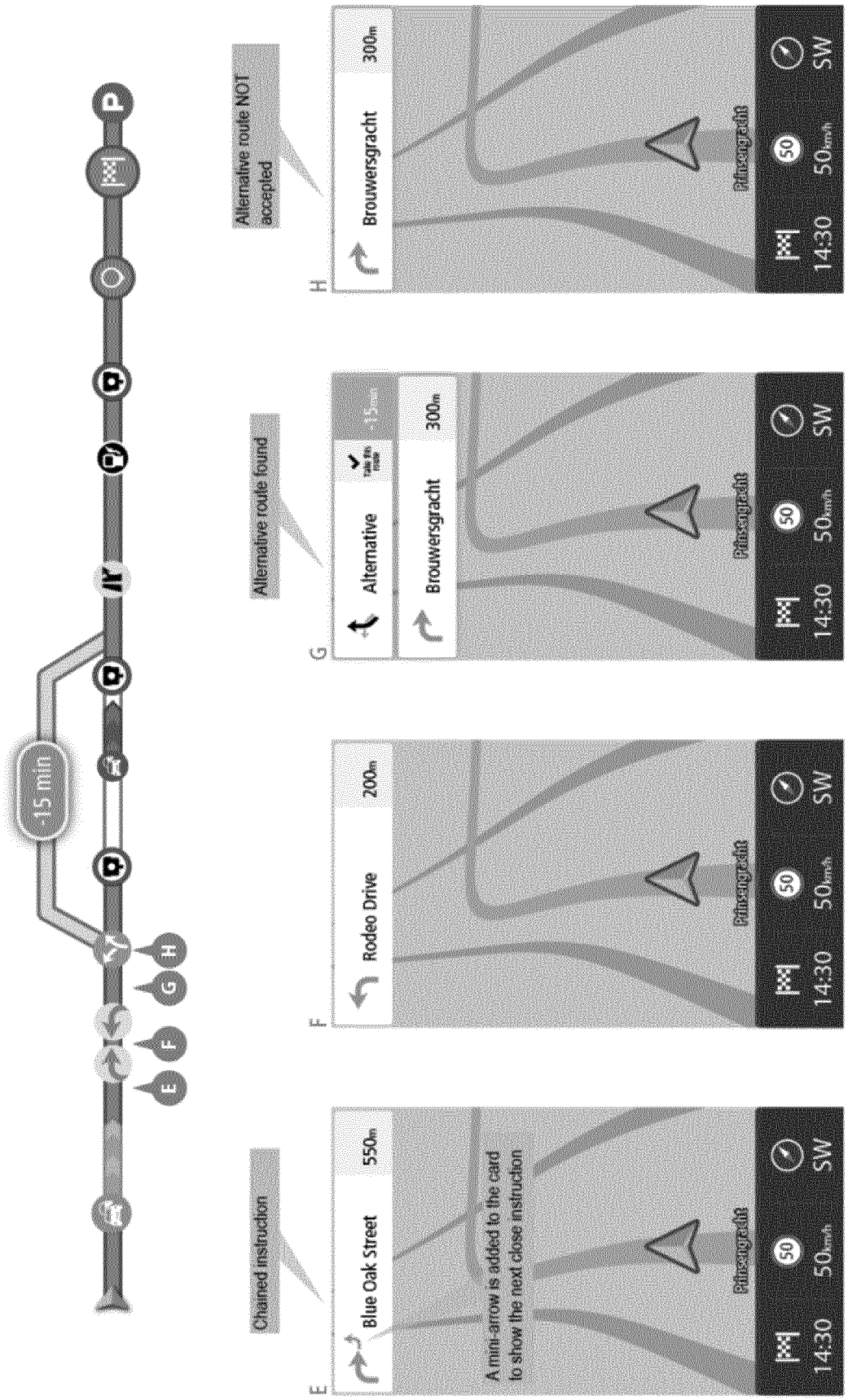
Figure 24C:
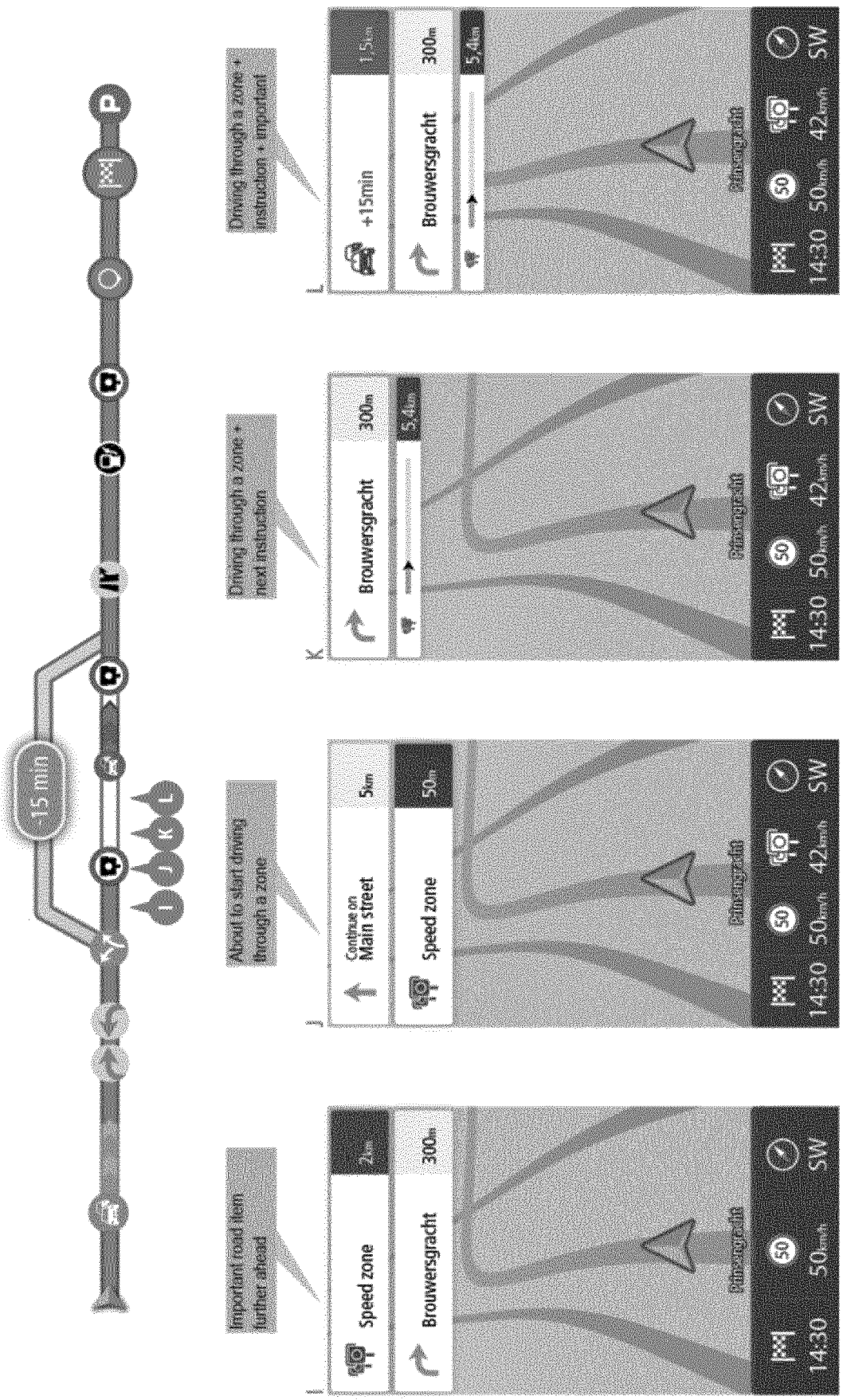

FIG. 24B illustrates the progress of the display as the user continues along the determined route. In particular, screen E of FIG. 24B shows an example of an instruction card including a 'chained instruction', i.e. where two instructions are required in quick succession and a mini-arrow is added to the instruction card as described above in relation to FIG. 6B. Screen F then shows the next instruction required to continue along the route. In screen G, an event card indicating that an alternative and quicker route has been calculated is displayed including an action button allowing the user to accept the alternative route (in which case the route would be re-calculated and the stack of cards updated accordingly). However, in this example, again, the alternative route is not accepted, and the alternative route card is eventually removed from the display, once it is no longer possible to take that route (or once the card has been dismissed by the user), and the display returns to the normal navigation guidance view, e.g. as shown in screen H.

The next event along the route is a restricted speed zone. Thus, as shown in screen I of FIG. 24C, upon determining that the navigation apparatus is approaching the speed zone (here, when the navigation apparatus is 2 km ahead of the speed zone, a Speed Zone card is displayed at the top of the GUI (in the secondary card position, as the speed zone occurs after the next instruction, in 300 m). As the user takes the next instruction, and is about to start driving through the speed zone, i.e. so that the speed zone is now the next item in the stack, the order of the display is changed as shown in screen J of FIG. 24C so that the Speed Zone card is now the primary card, and is displayed closest to the chevron. Once the navigation apparatus is driving through the zone, a mini speed zone card is displayed alongside the next instruction as shown in screen K showing the progress through the speed zone. The next event is traffic jam within the restricted speed zone. Screen L thus shows the display at a position where the user is currently driving through the speed zone and wherein a traffic jam is 1.5 km ahead of the user. Here, the onset of the traffic jam is after next instruction (in 300 m), so that the Traffic Jam card is displayed at the top of the display (as a secondary card, above the primary instruction card and the mini speed zone card).

Figure 24D:
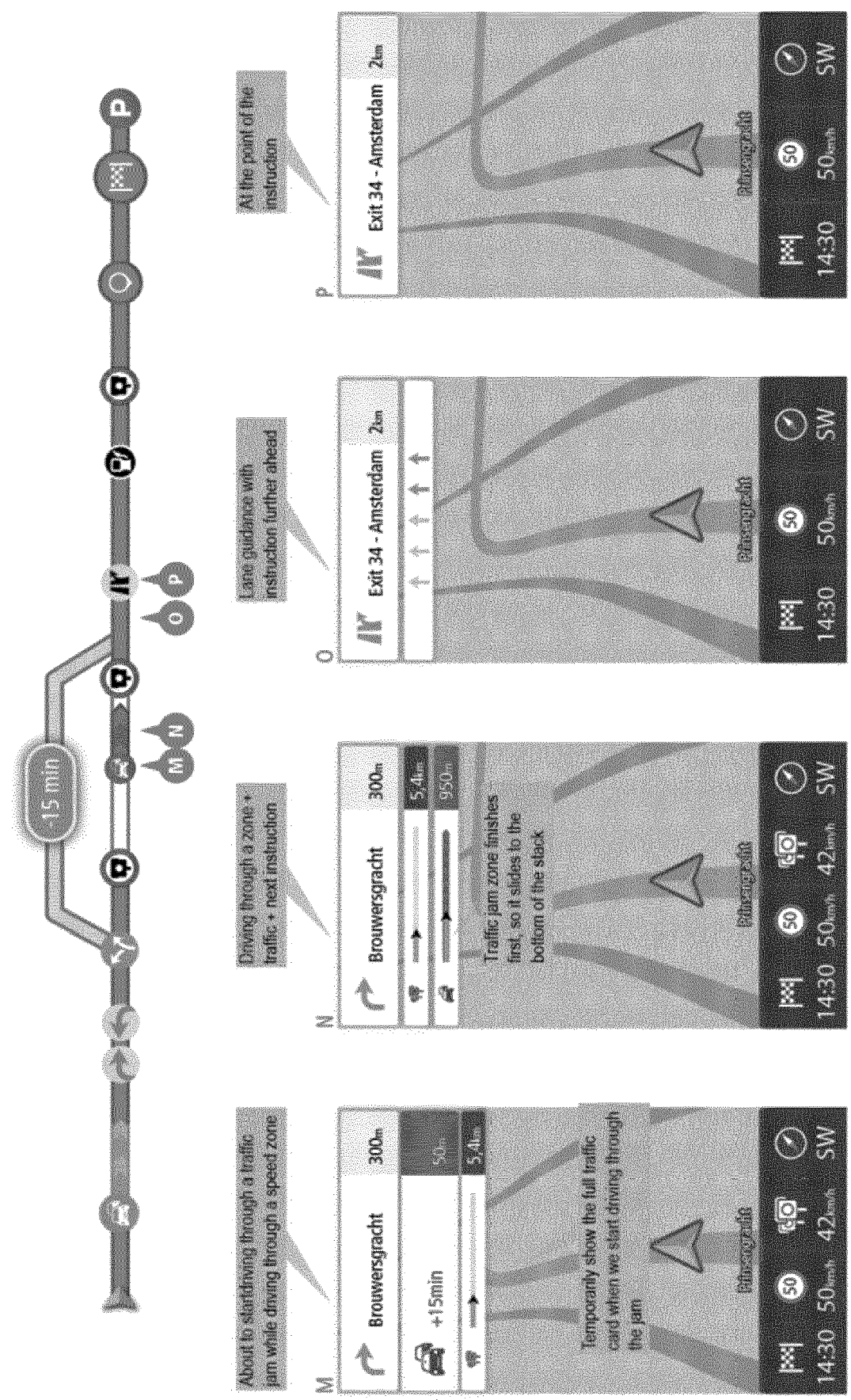

As the navigation apparatus approaches the traffic jam, so that the traffic jam is now closer than the next instruction, the order of the display is changed as shown in screen M of FIG. 24D. Once the navigation apparatus starts driving through the traffic jam, a traffic jam mini card is generated and displayed alongside the speed zone mini card and the primary instruction card. The order of the mini cards is chosen so that the event which ends first (in this case the traffic jam) is displayed closest to the chevron.

As the navigation apparatus continues along the determined route, the next instruction is to exit the current roadway. In order to do this, and continue along the route, the user must be in the correct lane. Thus, as shown in screen O of FIG. 24D, a mini lane guidance card showing which lane(s) the vehicle should be in in order to make the required manoeuvre is displayed alongside the instruction card indicating the required manoeuvre to exit the roadway. At the point of instruction, by which point the vehicle must be in the correct lane, the lane guidance card may be removed, so that only the instruction card is displayed, e.g. as shown in screen P.

Figure 24E:
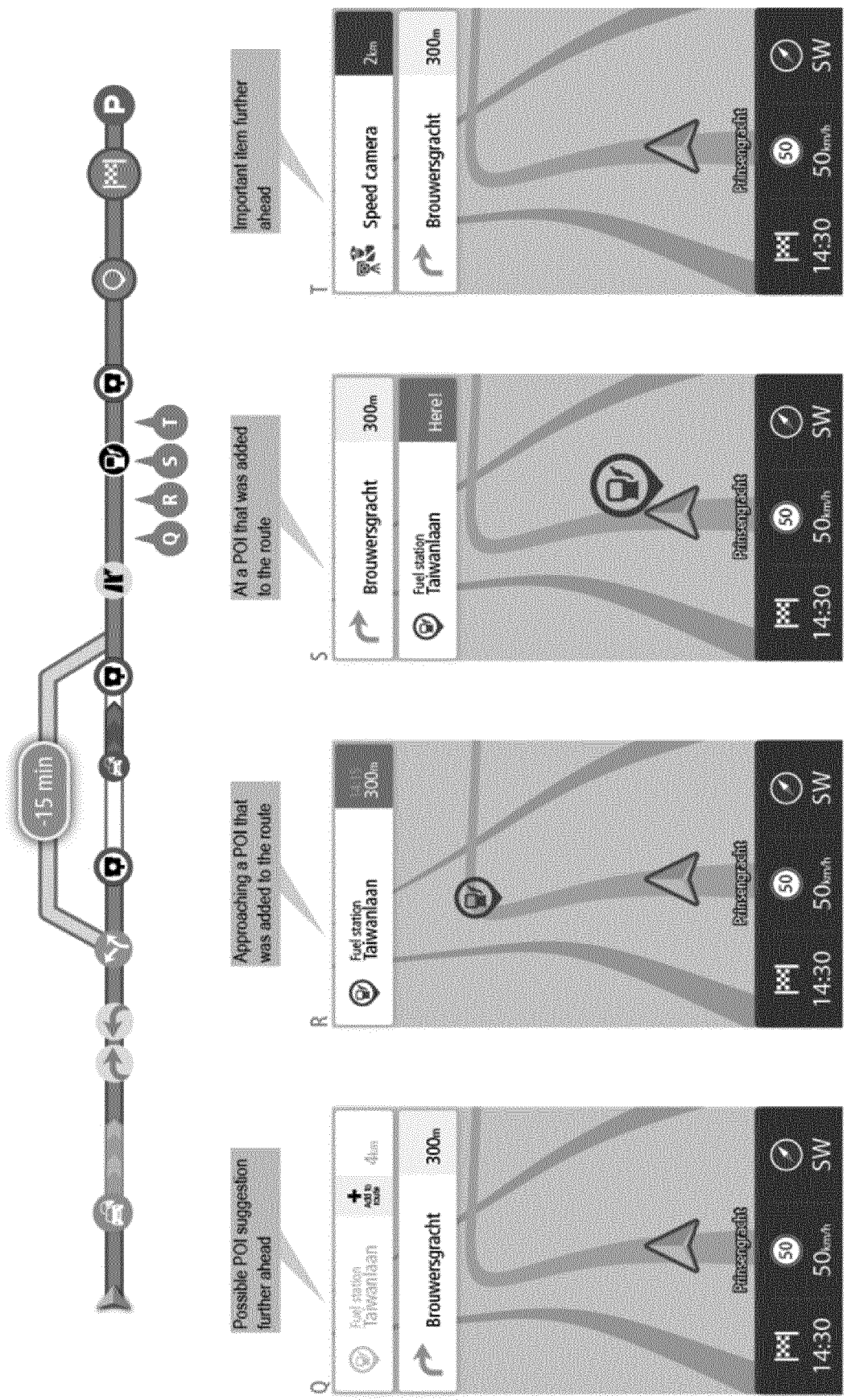

FIG. 24E illustrates how possible POI's may be suggested to the user and added to the route. For instance, as shown in screen Q of FIG. 24E, an event card is displayed showing a possible POI suggestion (here, representing an upcoming petrol station) that the user may wish to add into the route. Because the POI is not currently included on the route this is displayed in a different fashion to the primary cards (e.g. greyed out). The POI suggestion card includes an action button allowing the user to add the POI to the route. When the user selects to add the action button into the route, the route is recalculated to add the POI as a waypoint, e.g. as shown in screen R, and the waypoint card is added into the stack of cards for the recalculated route, and is displayed alongside the next instruction for the recalculated route, e.g. as shown in screen S of FIG. 24E.

Figure 24F:
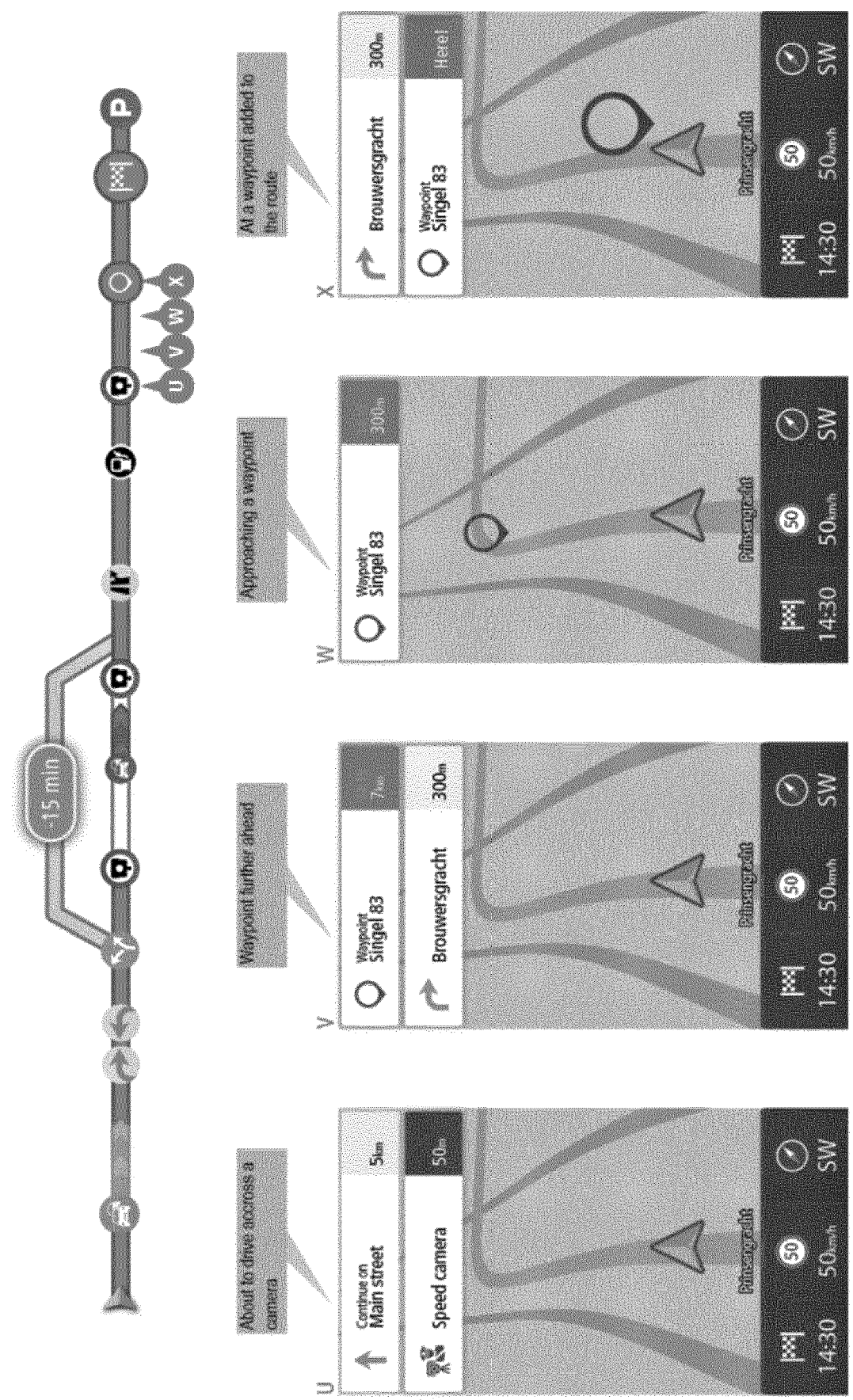

Screens T and U, shown respectively in FIGS. 24E and 24F, illustrate the display as the navigation apparatus approaches a speed camera. Initially, as shown in screen T, the Speed Camera card is displayed at the top of the display, alongside the next instruction. However, after the user has followed that instruction, so that the speed camera is the next item along the route, the Speed Camera card is moved into the primary card position closer to the chevron, and below the next instruction card, e.g. as shown in screen U.

Screens V, W and X of FIG. 24F illustrate an example of the display as the user approaches and arrives at a waypoint along the route.

Figure 24G:
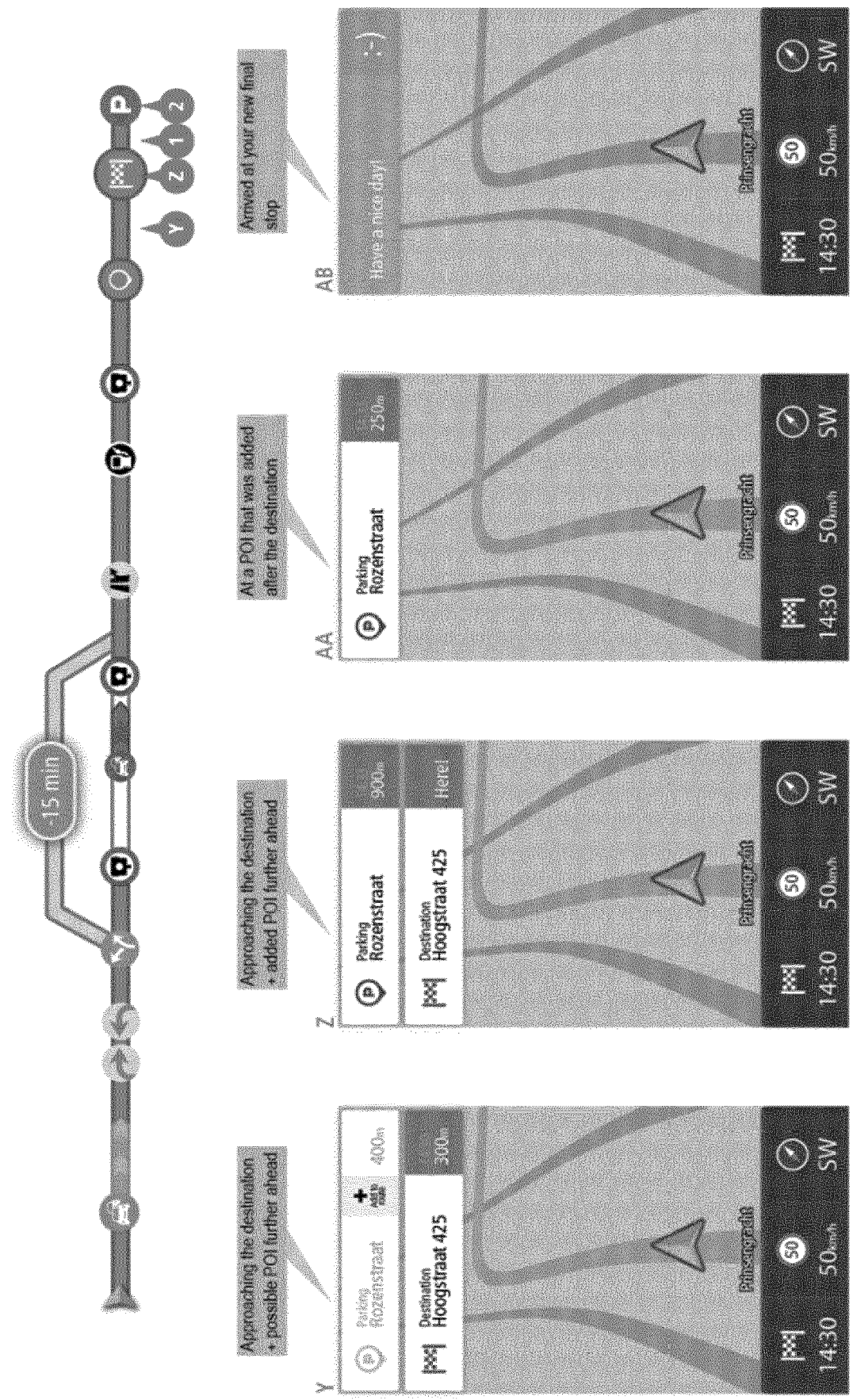

Screen Y of FIG. 24G shows the display as the user is approaching the destination. Alongside the destination card, a possible POI suggestion is displayed indicating nearby parking, which in this case is beyond the destination. As explained above, the user can select to add the parking into the route, in which case, a suitable card is added at the end of the stack, e.g. as shown in screen Z, and the route is extended to the parking zone which is now the final stop for the journey, e.g. as shown in screen AA. At the end of the journey, after arriving at the final stop, so that there are no remaining cards in the stack, the display may simply indicate this, e.g. by displaying a message such as "Have a nice day!" as shown in screen AB of FIG. 24G.

Although the present invention has been described with reference to various embodiments, it will be understood by those skilled in the art that various changes in form and detail may be made without departing from the scope of the invention as set forth in the accompanying claims.

The invention claimed is:

1. A method of providing information to guide a user along a determined route to a destination through a navigable network comprising a plurality of decision points using a navigation apparatus, the method comprising:
   obtaining a current position of the navigation apparatus;
   obtaining, using instructive data comprising data indicative of manoeuvres to be made by the user at decision points of the navigable network along the determined route, a next manoeuvre to be made by the user and a distance to the next manoeuvre from the current position of the navigation apparatus;
   determining, using informative data comprising data indicative of events on the determined route of which the user may want to be alerted, whether there is at least one event within a predetermined distance of the current position of the navigation apparatus, the predetermined distance being selected based on a type of event, and, when an event is determined to be within the predetermined distance, obtaining, using the informative data, a distance to the event from the current position of the navigation apparatus;
   determining an order in which first and second portions of a graphical user interface (GUI) are arranged relative to each other within a display window based on a comparison of the distance to the next manoeuvre from the current position of the navigation apparatus and the distance to the event from the current position of the navigation apparatus, wherein the first portion of the GUI comprises an indication of the next manoeuvre, and wherein the second portion of the GUI comprises an indication of the event, wherein if two or more events are determined to be within the predetermined distance, or a predetermined distance associated with each event, the second portion of the GUI comprises an indication of a first event, and a further portion of the GUI comprises an indication of a further event, the method comprising determining an order in which the first, second and further portions of the GUI are arranged relative to each other within a display window based on a comparison of the distances from the current position of the navigation apparatus to the next manoeuvre and to the first and further events; and
   providing data indicative of the GUI to a display device of the navigation apparatus to cause the display of the GUI thereon.

2. The method of claim 1, comprising receiving event data from a server based on the current position of the navigation apparatus, wherein the event data comprises data indicative of events of which the user may wish to be alerted, wherein the informative data is based on the received event data.

3. The method of claim 1, wherein the instructive data and the informative data are stored in at least one repository, the method comprising:
   accessing the instructive data stored in the at least one repository; and
   storing the informative data in the at least one repository.

4. The method of claim 1, wherein the instructive data comprises a list of manoeuvres ordered according to their position along the determined route from the current position of the navigation apparatus to the destination, the list of manoeuvres optionally being updated as the user progresses along the determined route.

5. The method of claim 1, wherein the informative data comprises a list of events on the determined route ordered according to their position along the determined route from the current position of the navigation apparatus to the destination, the list of manoeuvres optionally being updated as the user progresses along the determined route.

6. The method of claim 1, wherein the instructive data and informative data are stored together as a combined list of manoeuvre and events ordered according to their position along the determined route from the current position of the navigation apparatus to the destination, the list of manoeuvres and events optionally being updated as the user progresses along the determined route.

7. The method of claim 1, wherein the informative data comprises at least some data comprising dynamic travel information reflecting current, or near current, conditions on the navigable network.

8. The method of claim 1, wherein the GUI only includes portions for a predefined maximum number of events.

9. The method of claim 1, further comprising, at least in a navigation view, displaying a representation of a 2D or 3D navigation map in the graphical user interface simultaneously with displaying the first and second, and optionally further portion(s), relating to the next manoeuvre and event(s), wherein the navigation map provides a representation of a current position and an indication of the path to be taken from the current position to follow the predetermined route.

10. The method of claim 1, wherein the first and second portions, and optionally further portion(s), of the GUI comprise at least one selectable GUI element that can be individually selected by the user, for example using a touch based command, wherein a selection of a selectable GUI element of the first and/or second portion, and optionally further portion(s), of the GUI causes the GUI to show at least some, and preferably all, of the manoeuvres and events on the determined route from the current position to the destination in the display window.

11. The method of claim 1, wherein the navigation apparatus comprises an element that, when selected by the user, causes the determined route to be changed.

12. The method of claim 11, wherein the element is comprised in the GUI.

13. The method of claim 12, wherein the element is comprised in the second portion of the GUI.

14. A system for providing information to guide a user along a determined route to a destination through a navigable network comprising a plurality of decision points using a navigation apparatus, the system comprising:
 means for obtaining a current position of the navigation apparatus;
 means for obtaining, using instructive data comprising data indicative of manoeuvres to be made by the user at decision points of the navigable network along the determined route, a next manoeuvre to be made by the user and a distance to the next manoeuvre from the current position of the navigation apparatus;
 means for determining, from informative data comprising data indicative of events on the determined route of which the user may want to be alerted, whether there is at least one event within a predetermined distance of the current position of the navigation apparatus, the predetermined distance having been selected based on a type of event, and, when an event is determined to be within the predetermined distance, obtaining, using the informative data, a distance to the event from the current position of the navigation apparatus;
 means for determining an order in which first and second portions of a graphical user interface (GUI) are arranged relative to each other within a display window based on a comparison of the distance to the next manoeuvre from the current position of the navigation apparatus and the distance to the event from the current position of the navigation apparatus, wherein the first portion comprises an indication of the next manoeuvre, and wherein the second portion comprises an indication of the event, wherein if two or more events are determined to be within the predetermined distance, or a predetermined distance associated with each event, the second portion of the GUI comprises an indication of a first event, and a further portion of the GUI comprises an indication of a further event, the method comprising determining an order in which the first, second and further portions of the GUI are arranged relative to each other within a display window based on a comparison of the distances from the current position of the navigation apparatus to the next manoeuvre and to the first and further events; and
 means for providing data indicative of the GUI to a display device of the navigation apparatus to cause the display of the GUI thereon.

15. A non-transitory computer readable medium storing instructions that, when executed by one or more processors of a system, cause the system to perform a method of providing information to guide a user along a determined route to a destination through a navigable network comprising a plurality of decision points using a navigation apparatus, the method comprising:
 obtaining a current position of the navigation apparatus;
 obtaining, using instructive data comprising data indicative of manoeuvres to be made by the user at decision points of the navigable network along the determined route, a next manoeuvre to be made by the user and a distance to the next manoeuvre from the current position of the navigation apparatus;
 determining, using informative data comprising data indicative of events on the determined route of which the user may want to be alerted, whether there is at least one event within a predetermined distance of the current position of the navigation apparatus, the predetermined distance being selected based on a type of event, and, when an event is determined to be within the predetermined distance, obtaining, using the informative data, a distance to the event from the current position of the navigation apparatus;
 determining an order in which first and second portions of a graphical user interface (GUI) are arranged relative to each other within a display window based on a comparison of the distance to the next manoeuvre from the current position of the navigation apparatus and the distance to the event from the current position of the navigation apparatus, wherein the first portion of the GUI comprises an indication of the next manoeuvre, and wherein the second portion of the GUI comprises an indication of the event, wherein if two or more events are determined to be within the predetermined distance, or a predetermined distance associated with each event, the second portion of the GUI comprises an indication of a first event, and a further portion of the GUI comprises an indication of a further event, the method comprising determining an order in which the first, second and further portions of the GUI are arranged relative to each other within a display window based on a comparison of the distances from the current position of the navigation apparatus to the next manoeuvre and to the first and further events; and
 providing data indicative of the GUI to a display device of the navigation apparatus to cause the display of the GUI thereon.

* * * * *